(12) United States Patent
Madisetti et al.

(10) Patent No.: US 10,289,631 B2
(45) Date of Patent: *May 14, 2019

(54) METHOD AND SYSTEM FOR TUNING BLOCKCHAIN SCALABILITY FOR FAST AND LOW-COST PAYMENT AND TRANSACTION PROCESSING

(71) Applicants: Vijay K. Madisetti, Johns Creek, GA (US); Arshdeep Bahga, Chandigarh (IN)

(72) Inventors: Vijay K. Madisetti, Johns Creek, GA (US); Arshdeep Bahga, Chandigarh (IN)

(*) Notice: Subject to any disclaimer, the term of this patent is extended or adjusted under 35 U.S.C. 154(b) by 0 days.

This patent is subject to a terminal disclaimer.

(21) Appl. No.: 16/119,163

(22) Filed: Aug. 31, 2018

(65) Prior Publication Data
US 2018/0373776 A1    Dec. 27, 2018

Related U.S. Application Data

(63) Continuation of application No. 15/942,604, filed on Apr. 2, 2018, now Pat. No. 10,102,265.
(Continued)

(51) Int. Cl.
*G06F 16/27*    (2019.01)
*G06F 17/30*    (2006.01)
(Continued)

(52) U.S. Cl.
CPC ........ *G06F 16/27* (2019.01); *G06F 17/30575* (2013.01); *G06Q 20/0658* (2013.01);
(Continued)

(58) Field of Classification Search
CPC ......... G06F 17/30575; G06F 17/30174; G06F 17/30581; G06F 17/30377; G06F 16/27;
(Continued)

(56) References Cited

U.S. PATENT DOCUMENTS

2016/0283920 A1    9/2016  Fisher et al.
2016/0292672 A1*  10/2016  Fay .................... G06Q 20/363
(Continued)

*Primary Examiner* — Dung K Chau
(74) *Attorney, Agent, or Firm* — Daniel C. Pierron; Widerman Malek PL

(57) ABSTRACT

A method of synchronizing transactions between blockchains including receiving a first plurality of transactions on a first private blockchain network, recording the first plurality of transactions to a first private block on the first private blockchain network, receiving a second plurality of transactions on the first private blockchain network, recording the second plurality of transactions to a second private block on the first private blockchain network, generating a first merged block comprising the first and second private blocks, recording the first merged block to a single block on a second blockchain network, recording each of the first and second private blocks and the first merged block to a smart contract linked to the first private blockchain network, defining a first private smart contract, and performing a synchronization process between the first private smart contract and a second smart contract linked to the second blockchain network, defining a second smart contract.

19 Claims, 29 Drawing Sheets

Related U.S. Application Data

(60) Provisional application No. 62/484,555, filed on Apr. 12, 2017, provisional application No. 62/620,616, filed on Jan. 23, 2017.

(51) Int. Cl.
  *H04L 9/32* (2006.01)
  *H04L 9/06* (2006.01)
  *G06Q 20/06* (2012.01)

(52) U.S. Cl.
  CPC .......... *H04L 9/0637* (2013.01); *H04L 9/3234* (2013.01); *H04L 9/3239* (2013.01); *H04L 9/3247* (2013.01); *H04L 9/3263* (2013.01); *H04L 2209/38* (2013.01); *H04L 2209/56* (2013.01)

(58) Field of Classification Search
  CPC ... G06Q 40/10; G06Q 20/4014; G06Q 20/363
  USPC .................................................. 707/634, 614
  See application file for complete search history.

(56) References Cited

U.S. PATENT DOCUMENTS

| | | | |
|---|---|---|---|
| 2017/0132625 A1* | 5/2017 | Kennedy | G06Q 20/065 |
| 2017/0230375 A1* | 8/2017 | Kurian | H04L 63/102 |
| 2017/0243217 A1* | 8/2017 | Johnsrud | G06Q 20/4014 |
| 2017/0244720 A1 | 8/2017 | Kurian et al. | |
| 2017/0295232 A1 | 10/2017 | Curtis | |
| 2017/0329980 A1* | 11/2017 | Hu | G06F 21/606 |
| 2018/0025181 A1* | 1/2018 | Barinov | G06F 21/645 |
| 2018/0060836 A1* | 3/2018 | Castagna | G06Q 20/10 |
| 2018/0130050 A1* | 5/2018 | Taylor | G06Q 20/3674 |
| 2018/0285217 A1* | 10/2018 | Smith | G06F 11/1489 |
| 2018/0343114 A1 | 11/2018 | Ben-Ari | |

* cited by examiner

Decentralization Parameters 250

| Parameter | Description | Unit |
|---|---|---|
| 256 → $N_r$ | Total number of nodes in the network | Number |
| 258 → $N_p$ | Number of peers connected to each node | Number |
| 260 → $B_p$ | Minimum bandwidth required by a node to mine on the network | Mbps |
| 262 → $C_p$ | Minimum processing power required by a node to mine on the network | VCPUs |
| 264 → $D_p$ | Minimum disk I/O required by a node to mine on the network | MBps |
| 268 → $M_p$ | Minimum memory required by a node to mine on the network | GB |
| 270 → $T_{bs}$ | Bootstrap time for a node to start mining | sec |

Scalability Parameters 252

| Parameter | Description | Unit |
|---|---|---|
| 272 → $P_{tx}$ | Transaction throughput | Tx/sec |
| 274 → $T_{tx}$ | Transaction latency | sec |

Security Parameters 254

| Parameter | Description | Unit |
|---|---|---|
| 276 → $S_r$ | Stale block rate | % |
| 278 → $T_{bp}$ | Block propagation delay | sec |

FIG. 4

METHOD AND SYSTEM FOR TUNING BLOCKCHAIN SCALABILITY FOR FAST AND LOW-COST PAYMENT AND TRANSACTION PROCESSING

RELATED APPLICATIONS

This application claims the benefit under 35 U.S.C. § 120 of U.S. patent application Ser. No. 15/942,604 filed on Apr. 2, 2018 and titled Method and System for Tuning Blockchain Scalability for Fast and Low-Cost Payment and Transaction Processing, which in turn claims priority under 35 U.S.C. § 119(e) of U.S. Provisional Patent Application Ser. No. 62/484,555 filed on Apr. 12, 2017 and titled Method and System for Tuning Blockchain Scalability, and U.S. Provisional Patent Application Ser. No. 62/620,616 filed on Jan. 23, 2018 and titled Fast & Low Cost Payment and Transaction Processing on Blockchain Networks, the entire contents of which are incorporated herein by reference.

FIELD OF THE INVENTION

The present invention relates to blockchain-scalability, fast and low-cost payment and transaction processing on blockchain networks.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

Existing Blockchain platforms face scalability concerns. The transaction validation and consensus mechanisms (such as proof-of-work) used in blockchain networks and other parameters such as the block-size and block-time determine how fast the network can process and confirm the transactions. While commercial payment networks can process thousands of transactions per second, blockchain networks can take from a few seconds to several minutes for a transaction to be confirmed and have much less transaction throughput as compared to commercial payment networks. For example, Bitcoin network takes 10 minutes or longer to confirm transactions and achieves about 3-7 transactions/sec throughput. Similarly, Ethereum blockchain network where the block-time is roughly 17 seconds, and achieves about 7-15 transactions/sec throughput. Furthermore, many blockchain applications require multiple confirmations for newly mined blocks to secure the transactions from double-spending. For such applications, it may take several minutes for a transaction to be confirmed. While it is possible to make the block-times faster, so that the transactions can be processed faster, however, this would impact network security. Fast block-times would make it impossible for average-sized miners to run as full nodes and only the powerful miners would be able to afford the resources required to mine successfully on the blockchain network. Thus, fast block-times can lead to centralization risks. There exists a tradeoff between how fast the transactions can be processed on a blockchain network and the level of decentralization that can be maintained.

For distributed data systems, a trade-off exists between consistency and availability. These trade-offs are explained with the CAP Theorem, which states that under partitioning, a distributed data system can either be consistent or available but not both at the same time. According to the CAP theorem the system can either favor consistency and partition tolerance over availability, or favor availability and partition tolerance over consistency. The CAP theorem applies to blockchain networks as well. Blockchain gives up on consistency to be available and partition tolerant.

Blockchain protocols allow may limited and local adjustments to the blockchain parameters. In one approach, the parameter adjustment rules are defined in the client code itself (which is used by the blockchain nodes to transact and mine on the network) and the parameter values are adjusted for each block. This approach works for minor adjustments to blockchain parameters which can be defined in the blockchain client code. For major changes to the blockchain protocol, hard forks have to be typically used. A hard fork is a change to the underlying blockchain protocol. Hard forks are issued after a consensus is reached among the blockchain community about the changes to be incorporated in the fork. For issuing a hard fork, all the blockchain clients (which may be implemented in different programming languages) are updated and new releases of these clients are issued. The blockchain peers are then notified to upgrade their blockchain clients so that the new blockchain protocol can come into effect. Since a blockchain network is a peer-to-peer and decentralized network, realizing hard forks can be complex and time consuming. Miner nodes who do not upgrade their blockchain clients after a hard fork is issued will continue to mine on the pre-fork blockchain which is incompatible with the new blockchain protocol. It is expected that over time the miners running the old clients will eventually upgrade to the new clients so that they can continue to mine successfully on the main blockchain that follows the new protocol. No admission is necessarily intended, nor should be construed, that any of the preceding information constitutes prior art against the present invention.

General approaches for blockchain scalability can be categorized into the following areas:

Blockchain parameter tuning approaches: These approaches involve tuning the blockchain parameters such as block-size and block-time (or block-interval) to increase the transaction throughput and reduce transaction latency using local and limited approaches that require client upgrades and lengthy consensus.

On-chain Scaling with Sharding: Sharding involves splitting the task of consensus among concurrently operating sets of nodes, to improve the transaction throughput and reduce the per-node processing and storage requirements. Sharding approaches for blockchain either shard transaction processing or shard the state.

Off-chain Scaling with Channels: Channels based approaches use off-chain peer-to-peer payment channels that allow transactions to occur directly between participants rather than sending transactions on the blockchain, and the blockchain is used as a settlement mechanism.

Alternative blockchain designs and protocols: Other blockchain scalability approaches are based on using alternative blockchain designs and protocols. For example, the Bitcoin-NG proposal addresses the scalability bottleneck by having two types of blocks: key-blocks and microblocks. Key-blocks are used for leader election every epoch. Microblocks contain transactions and are generated by the epoch leader. Microblocks can be issued at very high speed as they are signed with the leader's private key and contain no proof of work.

Transaction processing on existing public blockchain networks requires high transaction fees to be paid to the network. The volume of transactions on the public blockchain networks increase, the fees will also increase. Due to high transaction fees, sending micro-transactions (or low value transactions) on the public blockchain networks are not economically feasible as the value of such transactions is lower than the fees paid to process the transactions.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method of capturing the Decentralization, Scalability and Security (DSS) constraints for blockchain networks.

In some embodiments, the method may further comprise quantifying the Decentralization, Scalability and Security levels based on various blockchain parameters.

Furthermore, embodiments of the invention may be directed to a system and associated methods for communicating the tuning parameters to the nodes in a blockchain network, so that the network can be tuned in an adaptive manner.

In some embodiments, the method may further comprise a unified model for tuning blockchain, without use of hard forks.

In some embodiments, the method may further comprise creating application-specific blockchain flavors which desired levels of Decentralization, Scalability and Security.

In some embodiments, the method may further comprise an adaptive tuning approach for blockchain parameters to meet the desired levels of Decentralization, Scalability and Security.

In some embodiments, the method may further comprise secure communication of the tuning parameters to the nodes in the blockchain network. The advantages to this embodiment of the invention for communicating the tuning parameters are as follows:

Allows changing the blockchain parameters dynamically, typically without expensive hard forks.

Allows the network to continue to process transactions while the changes are being applied.

Provides a secure way of deciding what changes are to be applied and how the changes are to be communicated.

Provision for rollbacks and checkpointing to handle anomalous conditions.

Another embodiment of the invention may be directed to a system for tuning the scalability of a blockchain network through an on-chain scaling approach to increase transaction throughput and reduce transaction latency.

Furthermore, embodiments of the invention may be directed to a system for tuning the scalability of a blockchain network through an off-chain scaling approach to enable micro-transactions between parties. The privacy of the micro-transactions on the private chain in the off-chain scaling embodiment is preserved as only a summarized view of the micro-transactions received in a particular time-period is recorded on the main blockchain. Use of specific protocols for communication of the tuning parameters in a secure, fault-tolerant and consistent manner that allows checkpointing and rollback is also provided.

Another embodiment of the invention may be directed to a system for checkpointing transactions between private and public blockchain networks.

Another embodiment of the invention may be directed to a system for cross-chain payments.

Another embodiment of the invention may be directed to a method of smart contract mirroring Another embodiment of the invention may be directed to a method of transaction replication and partitioning to speed up transactions.

Another embodiment of the invention may be directed to a method of filtering transactions into different classes and processing the transaction on private or public blockchain networks based on the class of transaction.

Embodiments of the present invention differ from existing off-chain solutions such as the Lightning Network and Raiden Network which leverage bidirectional payment channels to address the issues of scalability, latency and transaction fees for blockchain based payment applications and token transfers. Payment channels allow off-chain transfer of on-chain tokens or cryptocurrencies. A payment channel is created between two participants by depositing a certain quantity of tokens in smart contract. A payment channel is an agreement between two participants where the sender sets up a deposit in a smart contract for the receiver. Payments or transfer of tokens between the participants can then be done by sending signed messages without going through global consensus on the blockchain. Eventual settlement of payments between the participants happens when a payment channel is closed by either participant. The payment channel smart contract validates the last signed message and settles the claims. Payment channels can also be combined into a network, where a path connecting any two participants can be found. This allows payments between participants, who do not have direct channels between each other. A limitation of payment channels is that the participants need to lock up tokens in a payment channel contract upfront. The value of a payment cannot exceed the deposit used to setup a payment channel. Embodiments of the present invention adopt a different approach from payment channels by using a combination of public and private blockchain network with regular synchronization and checkpointing of transactions and mirroring of smart contract states. This approach does not require locking up funds upfront as in the case of payment channels. Double spending is prevented by synchronizing the accounts at regular intervals and combining and recording the transactions (done on a private blockchain) to a public blockchain network. Additionally, for accounts participating in off the public chain transfers (i.e. transfers on a private blockchain), the withdrawal or transfer of tokens from the public blockchain accounts can be disabled or locked through the use of smart contracts, to prevent the same funds from being sent elsewhere in the time interval between two synchronization points.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of synchronizing transactions between private and public blockchains including: receiving a first plurality of transactions on a first private blockchain network. The method of synchronizing transactions also includes recording the first plurality of transactions to a first private block on the first private blockchain network. The method of synchronizing transactions also includes receiving a second plurality of transactions on the first private blockchain network. The method of synchronizing transactions also includes recording the second plurality of transactions to a second private block on the first private blockchain network. The method of synchronizing transactions also includes generating a first merged block including the first private block and the second private block. The method of synchronizing transactions also includes recording the first merged block to a single block on a second blockchain network. The method of synchronizing transactions also includes recording each of the first private block, the second private block, and the first merged block to a smart contract linked to the first private blockchain network, defining a first private smart contract. The method of synchronizing transactions also includes performing a synchronization process between the first private smart contract and a second smart contract linked to the second blockchain network, defining a second smart contract. The method of synchronizing transactions also includes performing a checkpointing process between the first private smart contract and the second smart contract including recording the state of the first private smart contract to the second smart contract, defining a checkpointed first private smart contract. The method of synchronizing transactions also includes where the first private blockchain network has a parameter difference from the second blockchain network selected from the group including of block generation time, number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay. Other embodiments of this aspect include corresponding computer systems, apparatus, and computer programs recorded on one or more computer storage devices, each configured to perform the actions of the methods.

Implementations may include one or more of the following features. The method where: the second blockchain network is a public blockchain network. The method may also include the second smart contract is a public smart contract. The method where: the first plurality of transactions includes a plurality of transactions between two users, each transaction between the two users including a transfer of tokens from one user to the other, each user having an account on each of the first private blockchain network and the second blockchain network. The method may also include the first merged block includes a combined transaction including a net token value equaling the net of transfers of tokens between the two users in the plurality of transactions between the two users. The method where the first private smart contract is a multi-signature smart contract including a plurality of signatures, each signature being associated with a user. The method where an identity of a user having a signature included by the first private smart contract is validated by an identity verification and certification procedure. The method where the identity verification and certification procedure includes retrieving identity verifying information from an identity verification blockchain network. The method where the first private smart contract includes at least three signatures, each signature being associated with a separate user. The method further including: receiving a third plurality of transactions on a second private blockchain network. The method may also include recording the third plurality of transactions to a third private block on the second private blockchain network. The method may also include receiving a fourth plurality of transactions on the second private blockchain network. The method may also include recording the fourth plurality of transactions to a fourth private block on the second private blockchain network. The method may also include generating a second merged block including the third private block and the fourth private block. The method may also include recording the second merged block to a single block on the public blockchain network. The method may also include recording each of the third private block, the fourth private block, and the second merged block to a smart contract linked to the second private blockchain network, defining a second private smart contract. The method may also include performing a synchronization process between the second private smart contract and the public smart contract. The method may also include performing a checkpointing process between the second private smart contract and the public smart contract including recording the state of the second private smart contract to the public smart contract, defining a checkpointed second private smart contract. The method may also include where the second private blockchain network has a parameter difference from the public blockchain network selected from the group including of block generation time, number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay. The method further including: receiving a third plurality of transactions on a second private blockchain network. The method may also include recording the third plurality of transactions to a third private block on the second private blockchain network. The method may also include receiving a fourth plurality of transactions on the second private blockchain network. The method may also include recording the fourth plurality of transactions to a fourth private block on the second private blockchain network. The method may also include generating a second merged block including the third private block and the fourth private block. The method may also include recording the second merged block to a single block on the public blockchain network. The method may also include recording each of the third private block, the fourth private block, and the second merged block to a smart contract linked to the second private blockchain network, defining a second private smart contract. The method may also include performing a synchronization process between the second private smart contract and a second smart contract linked to the public blockchain network, defining a second public smart contract. The method may also include performing a checkpointing process between the second private smart contract and the public smart contract including recording the state of the second private smart contract to the second public smart contract, defining a checkpointed second private smart contract. The method may also include where the second private blockchain network has a parameter difference from the public blockchain network selected from the group including of block generation time, number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay. The method where the synchronization process includes: determining an account on the first private blockchain network that has a token balance decrease, defining a decreasing account. The method may also include moving a value of the token balance decrease from an account on the public blockchain network corresponding to the decreasing account to a vault account on the public blockchain network. The method may also include determining if a total token supply on the private blockchain network has increased since an immediate previous synchronization process. The method may also include if the total token supply on the private blockchain network has increased, creating new tokens and sending them to the vault account. The method may also include if the total token supply on the private blockchain network has not increased, burning an amount of tokens from the vault account equal to the token balance decrease. The method may also include determining an account on the first private blockchain network that has a token balance increase, defining an increasing account. The method may also include moving a value of the token balance increase from the vault account to an account on the public blockchain network corresponding to the increasing account. The method where the second blockchain network is a second private blockchain network and the second smart contract is a second private smart contract, the method further including. The method may also include receiving a third plurality of transactions on the first private blockchain network. The method may also include recording the third plurality of transactions to a third private block on the first private blockchain network. The method may also include receiving a fourth plurality of transactions on the first private blockchain network. The method may also include recording the fourth plurality of transactions to a fourth private block on the first private blockchain network. The method may also include generating a second merged block including the third private block and the fourth private block. The method may also include recording the second merged block to the second private blockchain network. The method may also include generating a third merged block including each of the first and second merged blocks. The method may also include recording the third merged block to a third blockchain network. The method where the second private blockchain network has a parameter difference from each of the first private blockchain network and the third blockchain network selected from the group including of block generation time number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay. The method where: a block generation time of the first private blockchain network is within a range from 1 millisecond (ms) to 10 ms, a block generation time of the second private blockchain network is within a range from 1 second to 10 seconds, and a block generation time of the third blockchain network is within a range from 1 minute to 10 minutes. The method further including: recording the third and fourth private blocks and the second merged block to the first private blockchain smart contract. The method may also include performing a synchronization process between the first private smart contract and the second smart contract. The method may also include performing a checkpointing process between the first private smart contract and the second private smart contract including recording the state of the first private smart contract to the second private smart contract, redefining the checkpointed first private smart contract. The method may also include recording each of the first, second, and third merged blocks to a third smart contract linked to the second private blockchain network, defining a third private smart contract. The method may also include performing a synchronization process between the third private smart contract and a fourth smart contract linked to the third blockchain network, defining a fourth smart contract. The method may also include performing a checkpointing process between the third private smart contract and the fourth smart contract including recording the state of the third private smart contract to the fourth smart contract, defining a checkpointed third private smart contract. The method where the third blockchain network is a public blockchain network. The method further including: applying a filter to the first plurality of transactions. The method may also include determining a subset of transactions of the first plurality of transactions. The method may also include excluding the subset of transactions from being recorded to the first merged block. The method further including: identifying a failure of the first private blockchain network. The method may also include recording a transaction on the first private blockchain network to a first private blockchain network transaction log, defining a logged transaction. The method may also include retrieving the checkpointed first private smart contract from the second smart contract. The method may also include recording the checkpointed first private smart contract to the first private blockchain network, defining a restored first private smart contract. The method may also include recording the logged transaction to the restored first private smart contract. Implementations of the described techniques may include hardware, a method or process, or computer software on a computer-accessible medium.

Further embodiments of the invention may include a method of synchronizing transactions between private and public blockchains including: receiving a first plurality of transactions on a first private blockchain network. The method of synchronizing transactions also includes recording the first plurality of transactions to a first private block on the first private blockchain network. The method of synchronizing transactions also includes receiving a second plurality of transactions on the first private blockchain network. The method of synchronizing transactions also includes recording the second plurality of transactions to a second private block on the first private blockchain network. The method of synchronizing transactions also includes generating a first merged block including the first private block and the second private block. The method of synchronizing transactions also includes recording the first merged block to a single block on a public blockchain network. The method of synchronizing transactions also includes recording each of the first private block, the second private block, and the first merged block to a smart contract linked to the first private blockchain network, defining a first private smart contract; performing a synchronization process between the first private smart contract and a smart contract linked to the public blockchain network, defining a public smart contract, the synchronization process including. The method of synchronizing transactions also includes determining an account on the first private blockchain network that has a token balance decrease, defining a decreasing account. The method of synchronizing transactions also includes moving a value of the token balance decrease from an account on the public blockchain network corresponding to the decreasing account to a vault account on the public blockchain network. The method of synchronizing transactions also includes determining if a total token supply on the private blockchain network has increased since an immediate previous synchronization process. The method of synchronizing transactions also includes if the total token supply on the private blockchain network has increased, creating new tokens and sending them to the vault account. The method of synchronizing transactions also includes if the total token supply on the private blockchain network has not increased, burning an amount of tokens from the vault account equal to the token balance decrease. The method of synchronizing transactions also includes determining an account on the first private blockchain network that has a token balance increase, defining an increasing account. The method of synchronizing transactions also includes moving a value of the token balance increase from the vault account to an account on the public blockchain network corresponding to the increasing account. The method of synchronizing transactions also includes performing a checkpointing process between the first private smart contract and the second smart contract including recording the state of the first private smart contract to the public smart contract, defining a checkpointed first private smart contract. The method of synchronizing transactions also includes where the first private blockchain network has a parameter difference from the public blockchain network selected from the group including of block generation time, number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay. The method of synchronizing transactions also includes where the first private smart contract is a multi-signature smart contract including a plurality of signatures, each signature being associated with a user. Other embodiments of this aspect include corresponding computer systems, apparatus, and computer programs recorded on one or more computer storage devices, each configured to perform the actions of the methods.

Implementations may include one or more of the following features. The method where: the first plurality of transactions includes a plurality of transactions between two users, each transaction between the two users including a transfer of tokens from one user to the other, each user having an account on each of the first private blockchain network and the public blockchain network. The method may also include the first merged block includes a combined transaction including a net token value equaling the net of transfers of tokens between the two users in the plurality of transactions between the two users. Implementations of the described techniques may include hardware, a method or process, or computer software on a computer-accessible medium.

Further embodiments of the invention may include a system for synchronizing transactions between private and public blockchains including: a processor. The system also includes a data store positioned in communication with the processor. The system also includes a network communication device positioned in communication with each of the processor, the data store, and a network. The system also includes where the network communication device is operable to receive a first plurality of transactions on a first private blockchain network. The system also includes where the processor is operable to record the first plurality of transactions to a first private block on the first private blockchain network. The system also includes where the network communication device is operable to receive a second plurality of transactions on the first private blockchain network. The system also includes where the processor is operable to record the second plurality of transactions to a second private block on the first private blockchain network. The system also includes where the processor is operable to generate a first merged block including the first private block and the second private block. The system also includes where the processor is operable to record the first merged block to a single block on a second blockchain network. The system also includes where the processor is operable to record each of the first private block, the second private block, and the first merged block to a smart contract linked to the first private blockchain network, defining a first private smart contract. The system also includes where the processor is operable to perform a synchronization process between the first private smart contract and a second smart contract linked to the second blockchain network, defining a second smart contract. The system also includes where the processor is operable to perform a checkpointing process between the first private smart contract and the second smart contract including recording the state of the first private smart contract to the second smart contract, defining a checkpointed first private smart contract. The system also includes where the first private blockchain network has a parameter difference from the second blockchain network selected from the group including of block generation time, number of network nodes, number of connected peers, minimum network bandwidth requirement, minimum mining processing power requirement, minimum mining disk input/output requirement, minimum mining memory requirement, mining bootstrap time requirement, transaction throughput, transaction latency, stale block rate, and block propagation delay.

Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 4 is an illustration of exemplary decentralization, scalability and security parameters, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
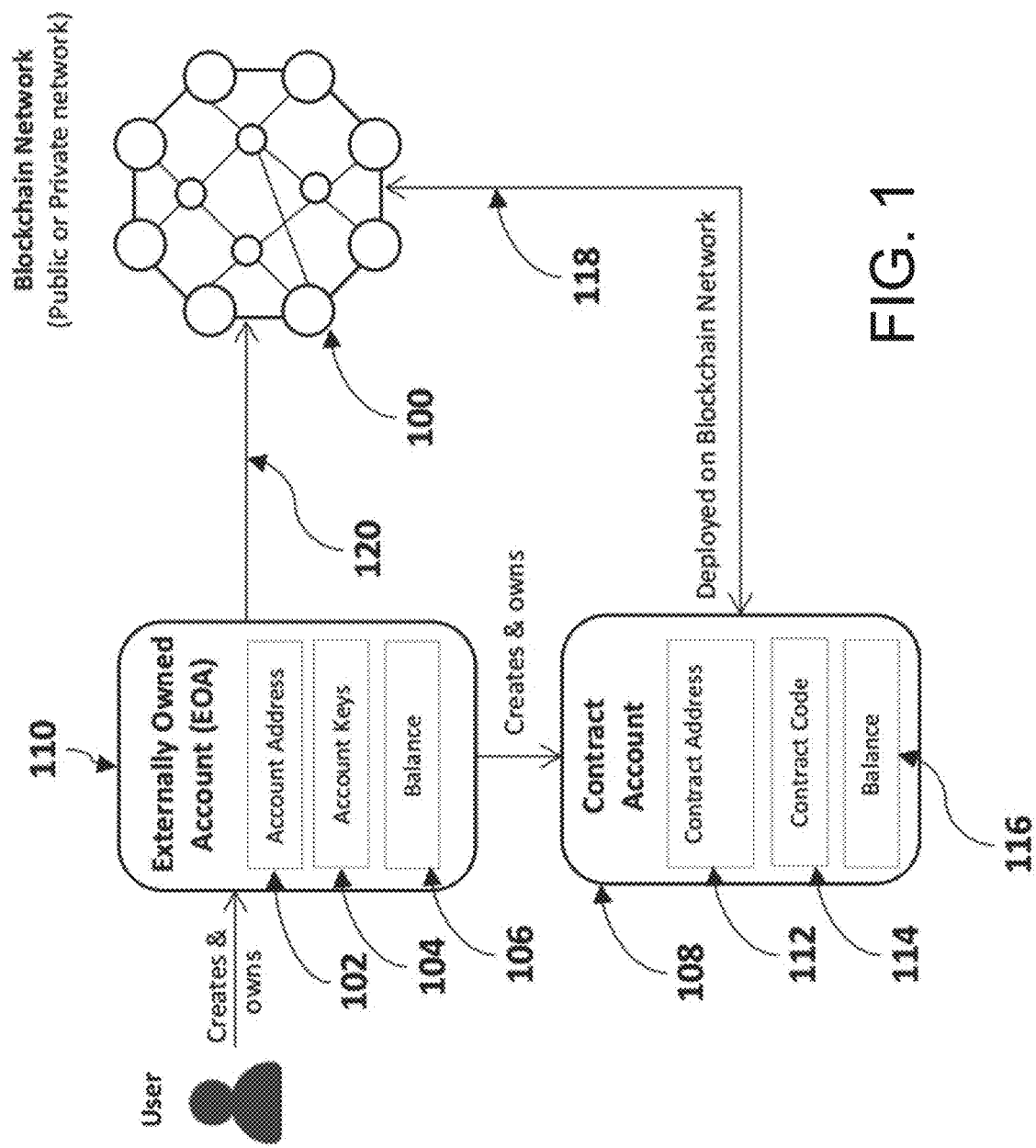
FIG. 1 is an illustration of the blockchain account types and interactions.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 114 execution is triggered by transactions 118 sent by EOAs or messages sent by other contracts.

Figure 2:
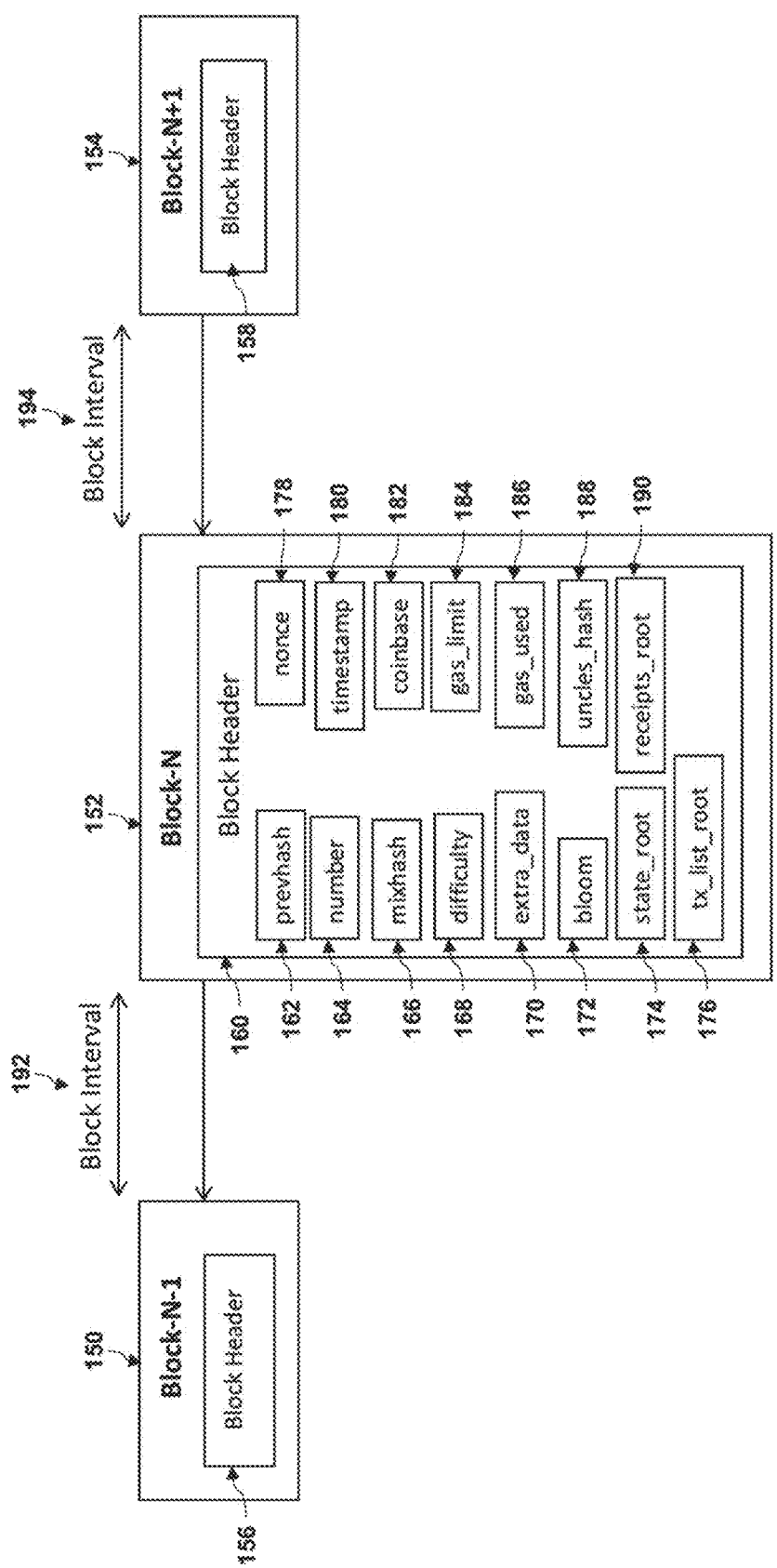
FIG. 2 is an illustration of an existing blockchain design used by public blockchain networks such as Ethereum.

Referring now to FIG. 2, for example, and without limitation, a structure of blockchain is described in more detail. A blockchain comprises a sequence of blocks 150, 152, 154 generated after block intervals 192, 194, where each block is identified by its cryptographic hash (the nonce field) 178 and references the hash of its parent block. The cryptographic hash of a block is used to verify that a sufficient amount of computation has been carried out on this block and the block contains a valid proof-of-work (PoW). Each block maintains records of all the transactions on the network received since the creation of its previous block. Instead of storing the information on all the transactions within the block itself, a special data structure called a Merkle tree is used to store the transactions and only the hash of the root of the Merkle tree is stored in the block. A block header 160 has the following fields:

Block Number (number) 164: This is a scalar value equal to the number of ancestors of the block. For genesis block, the block number is zero.

Timestamp (timestamp) 180: This is the UNIX timestamp value at the creation of the block.

Nonce (nonce) 178: The nonce field is a 64-bit hash, which along with mixhash field is used to verify that a sufficient amount of computation has been carried out on this block, and the block contains a valid proof-of-work (PoW).

Mix Hash (mixhash) 166: The mixhash field is a 256-bit hash, which along with nonce field is used to verify that the block contains a valid proof-of-work.

Parent Hash (prevhash) 162: Each block in a blockchain is linked to its parent through the parentHash, which is the hash of the parent block header.

Coinbase Address (coinbase) 182: This is a 20-byte address of the account to which all the rewards for mining of the block and the execution of contracts are transferred.

Block Difficulty (difficulty) 168: This field specifies a difficulty value for mining. A block is valid only if it contains a valid proof-of-work (PoW) of a given difficulty.

Gas Limit (gas_limit) 184: The gas limit value is the limit of gas expenditure for the block.

Gas Used (gas_used) 186: This is the total gas used for all the transactions in the block.

Extra Data (extra_data) 170: Optional 32-byte extra data can be provided in the block.

Uncles Hash (uncles_hash) 188: This is the 32 byte hash of the RLP encoded list of uncle headers.

State Root (state_root) 174: This is the 32 byte hash of the root of the block's state trie after the transactions are executed.

Transactions List Root (tx_list_root) 176: This is the 32 byte hash of the root of the block's transaction trie which is populated with the transactions in the block.

Receipts Root (receipts_root) 190: This is the 32 byte hash of the root of the block's receipts trie which is populated with the receipts of the transaction in the transactions list of the block.

Bloom Filter (bloom) 172: Bloom filter composed from the set of logs created through execution of the transactions in the block.

Each of the block headers 156, 158 may comprise the above-recited fields.

Figure 3:
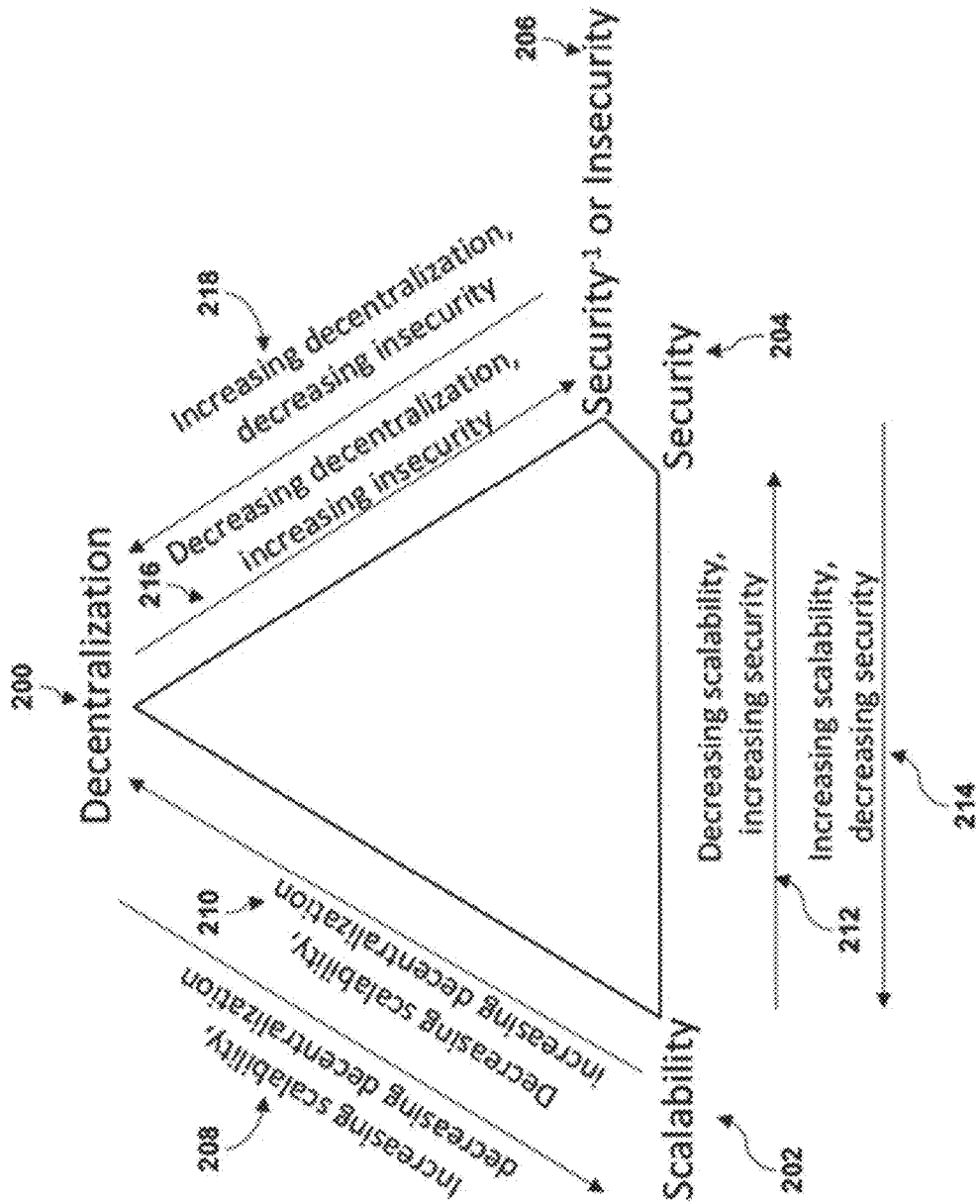
FIG. 3 is an illustration of the Decentralization, Scalability and Security (DSS) framework for a blockchain network, according to an embodiment of the invention.

Referring to FIG. 3, a Decentralization, Scalability and Security (DSS) framework or theorem which captures the constraints between decentralization, scalability and security for a blockchain network, is described in more detail. An embodiment of the invention provides method for capturing the tradeoffs between blockchain decentralization, scalability and security. Decentralization, scalability and security for a blockchain network are defined as follows:

Decentralization: Decentralization 200 of a blockchain network is defined by the ability of the network to process and settle the transactions without the need for a central authority. A blockchain network is a truly peer-to-peer network and it does not require a trusted central authority or intermediaries to authenticate or to settle the transactions or to control the network infrastructure. The level of decentralization of a blockchain network depends on the resource requirements for the peers to participate in a network. Higher the resource requirements for peers, lowers the level of decentralization as only peers with powerful hardware will be able participate and mine on the network.

Scalability: Scalability 202 of a blockchain network is defined by the ability of the network to process a growing number of transactions. Scalability for a blockchain network is defined in terms of metrics such as transaction throughput and transaction latency. As a reference, Bitcoin network takes 10 min or longer to confirm transactions and achieves a throughput of 3-7 transactions/sec.

Security: Security 204 for a blockchain network is defined as the ability of the network to be secure against attackers and prevent double spending. Blockchain has the ability to establish trust in a peer-to-peer network through a distributed consensus mechanism rather than relying on a powerful central authority.

The DSS theorem states that it is impossible to simultaneously provide high levels of Decentralization, Scalability and Security (DSS) for blockchain networks.

The levels of Decentralization ($L_D$), Scalability ($L_{Sc}$) and Security ($L_{Se}$) for blockchain networks are tunable subject to the following constraints:

$$L_{Sc} \propto (1/L_D)^a \propto (1/L_{Se})^b$$

where exponents a and b are dependent on the blockchain platform. The Decentralization, Scalability and Security (DSS) constraints according to an embodiment of the present invention are described as follows:

Scalability and Security: The level of scalability in a blockchain network is inversely proportional to the level of security. If a blockchain network is scaled-up to increase transaction throughput or decrease transaction latency, the level of security of the network decreases 214. For example, a scaling-up measure such as reducing block interval period (to decrease transaction latency) reduces the level of security due to larger number of stale blocks being produced which do not contribute to the network security. Inversely, as scalability decreases, security increases 212.

Scalability and Decentralization: The level of scalability in a blockchain network is inversely proportional to the level of decentralization. If a blockchain network is scaled-up to increase transaction throughput or decrease transaction latency, the level of decentralization of the network decreases 208. For example, a scaling-up measure such as increasing block size (to increase transaction throughput) reduces the level of decentralization as the computational and storage load on each node will increase and the nodes running on commodity hardware will not be able to catch-up and mine on the network. Inversely, as scalability decreases, decentralization increases 210.

Decentralization and Security: The level of decentralization in a blockchain network is directly proportional to the level of security or inversely proportional to level of insecurity 206. If the level of decentralization of blockchain network is decreased, the security of the network decreases or insecurity increases 216. For example, a lower-level of decentralization means that the network is controlled by groups of miners or mining pools. Mining pools can collude to compromise the security of the network and attempt a '51% attack'. In a 51% A attack, the pool can rewrite the blockchain history and do double-spending to their advantage. Inversely, as decentralization increases, insecurity decreases 218.

Referring now to FIG. 4, for example, and without limitation, the decentralization, scalability and security parameters, are described in more detail. The level of Decentralization ($L_D$) is quantified in terms of the following blockchain parameters 250:

$N_T$: Total number of nodes in the network 256;
$N_P$: Number of peers connected to each node 258;
$B_p$: Minimum bandwidth required by a node to mine on the network 260;
$C_p$: Minimum processing power required by a node to mine on the network 262;
$D_p$: Minimum disk I/O required by a node to mine on the network 264;
$M_p$: Minimum memory required by a node to mine on the network 268; and
$T_{bs}$: Bootstrap time for a node to start mining 270.

The level of Decentralization ($L_D$) is specified as:

$$L_D = fn(N_T, N_P, B_p, C_p, D_p, M_p, T_{bs})$$

where: $0 <= L_D <= 10$
$L_D = 0$: No decentralization
$L_D = 10$: Highly decentralized The level of Scalability ($L_{Sc}$) is quantified in terms of the following blockchain parameters 252:

$P_{tx}$: Transaction throughput 272; and
$T_{tx}$: Transaction latency 274.

The level of Scalability ($L_{Sc}$) is specified as:

$$L_{Sc} = fn(P_{tx}, T_{tx})$$

where:
$0 <= L_{Sc} <= 10$
$L_{Sc} = 0$: No scalability
$L_{Sc} = 10$: Highly scalable The level of Security ($L_{Se}$) is quantified in terms of the following blockchain parameters 254:

$S_r$: Stale block rate 276; and
$T_{bp}$: Block propagation delay 278.

Figure 5:
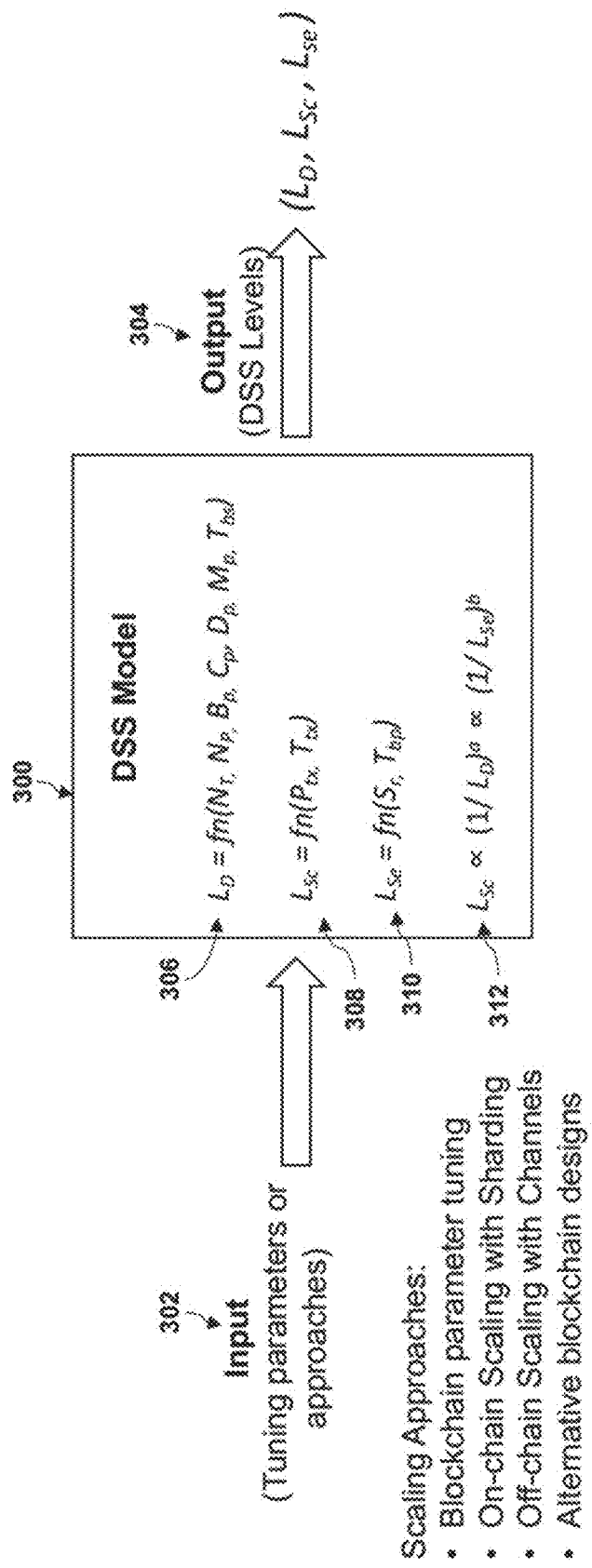
FIG. 5 is an illustration of unified model and protocol for tuning blockchain, according to an embodiment of the invention.

The level of Security ($L_{Se}$) is specified as:

$$L_{Se} = fn(S_r, T_{bp})$$

where:
$0 <= L_{Se} <= 10$
$L_{Se} = 0$: No security
$L_{Se} = 10$: Highly secure Referring now to FIG. 5, a unified model and protocol for tuning blockchain, is described in more detail. The unified model and protocol for tuning blockchain provides a standardized way of comparing various blockchain scalability approaches. With this model we can quantify the benefits of various scaling approaches in the form of DSS levels (where each level is on the scale of 0 to 10). The DSS model 300 can be created by learning the dependencies between DSS levels based on experimental measurement of the various blockchain parameters for a blockchain network. Each blockchain network has its own DSS model. The DSS model is dependent on the blockchain technology or platform (such as Bitcoin, Ethereum) and also its network deployment (e.g. public unpermissioned or private permissioned). Once a DSS model is built for a blockchain network, the blockchain can be tuned according to various scaling approaches, and the benefits of these approaches can be compared in the form of DSS levels. The tuning process involves providing the blockchain tuning parameters as input 302 to the DSS model 300 for a blockchain network. The output 304 of the DSS model are the levels of decentralization ($L_D$) 306, scalability ($L_{Sc}$) 308 and security ($L_{Se}$) 310, where the levels are related according to equation 312, with $L_{Sc}$ 308 being inversely proportional to $L_D$ 306 which is in turn inversely proportional to $L_{se}$ 310. The tuning is also especially useful when nodes in the blockchain network fail or the network may be partitioned so that reallocation of work may be suitably done.

The DSS theorem described above is compatible with and complimentary to a consistency, availability and partition tolerance (CAP) theorem applied to a blockchain network. According to CAP for blockchain, a blockchain network is always be available and eventually-consistent. Whereas, according to DSS for a blockchain, a blockchain network cannot simultaneously have high levels of Decentralization, Scalability and Security. The levels of Decentralization, Scalability and Security for blockchain networks are tunable subject to the DSS constraints. Blockchain platforms may use different consensus mechanisms, blockchain designs or parameters to tune the consistency, availability and partition-tolerance of the blockchain network. With a DSS model for a blockchain network, it is possible to quantify the effects of various consensus mechanisms, blockchain designs or parameters on the decentralization, scalability and security of the blockchain network. For example, with a DSS model, we can compare the effects of switching the consensus mechanism on a blockchain network from Proof-of-Work to Proof-of-Stake. Similarly, we can compare the effects of changing the block-size and block-interval parameters for a blockchain network.

Figure 6:
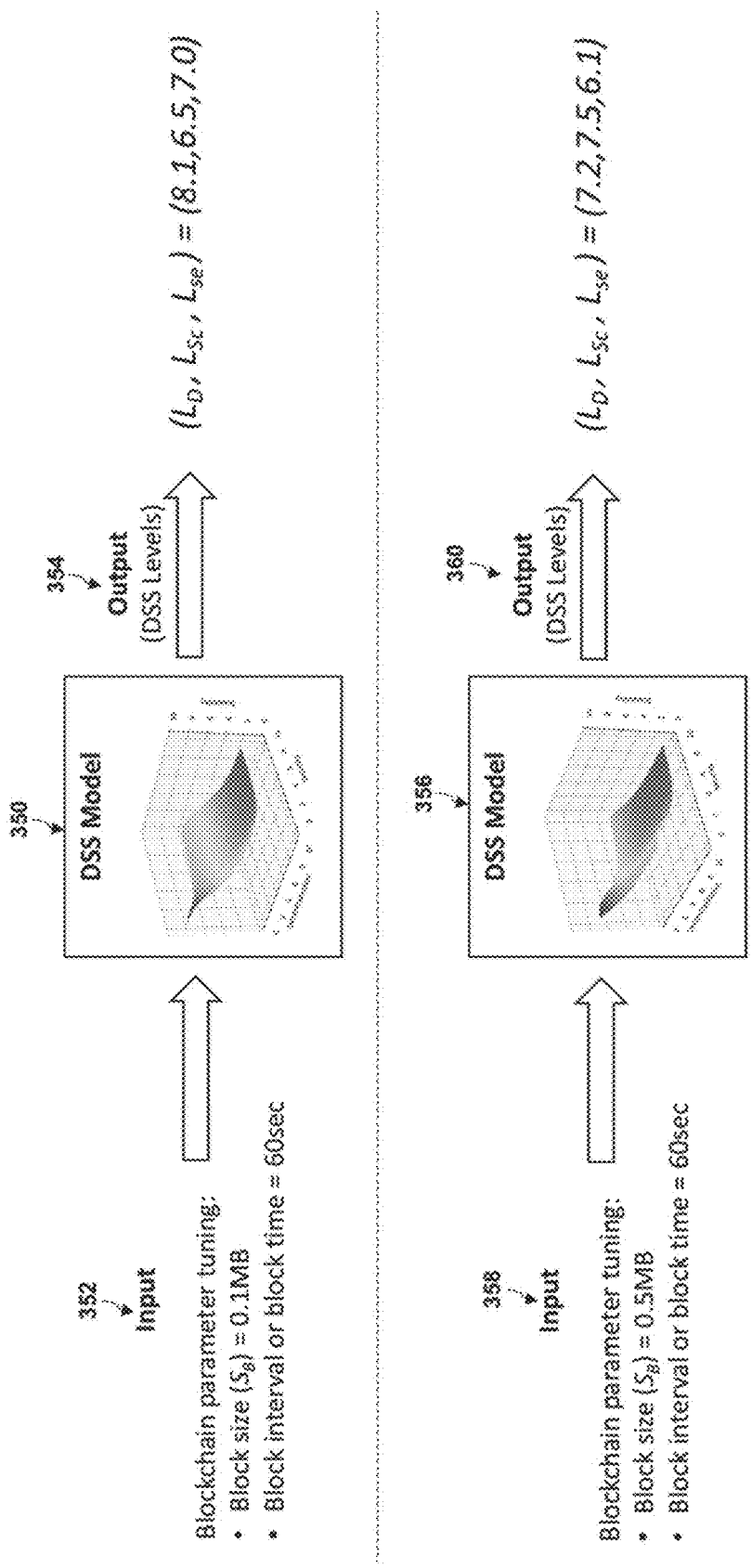
FIG. 6 is an illustration of a method for creating application-specific blockchain flavors, according to an embodiment of the invention.

Referring now to FIG. 6, a method aspect of the present invention for creating application-specific blockchain flavors, is described in more detail. The DSS unified model described above, allows creating application-specific blockchain flavors, which use the same blockchain technology or platform but differ only in the blockchain parameters. For example, the Ethereum blockchain platform can be used to create multiple blockchain networks or deployments, where each network may have a different level of decentralization, scalability and security based on the business or application requirements. For a blockchain network which is to be used for applications involving sensitive data (such as healthcare), it may be desirable to have higher levels of security by compromising on the scalability or decentralization, having inputs 352 such as relatively smaller block sizes $S_B$ of, for instance, 0.1 megabytes, and a block interval of 60 seconds which, when applied to the DSS model 350, yielding output 354. Whereas, for a blockchain network which is to be used for Internet of Things (IoT) applications, it may be desirable to have higher levels of scalability by compromising on the security or decentralization, having inputs 358 of a block size of 0.5 megabytes and a block interval of 60 seconds that, when DSS model 356 is applied, yields output 360. One of ordinary skill in the art may perform this analysis.

Figure 7:
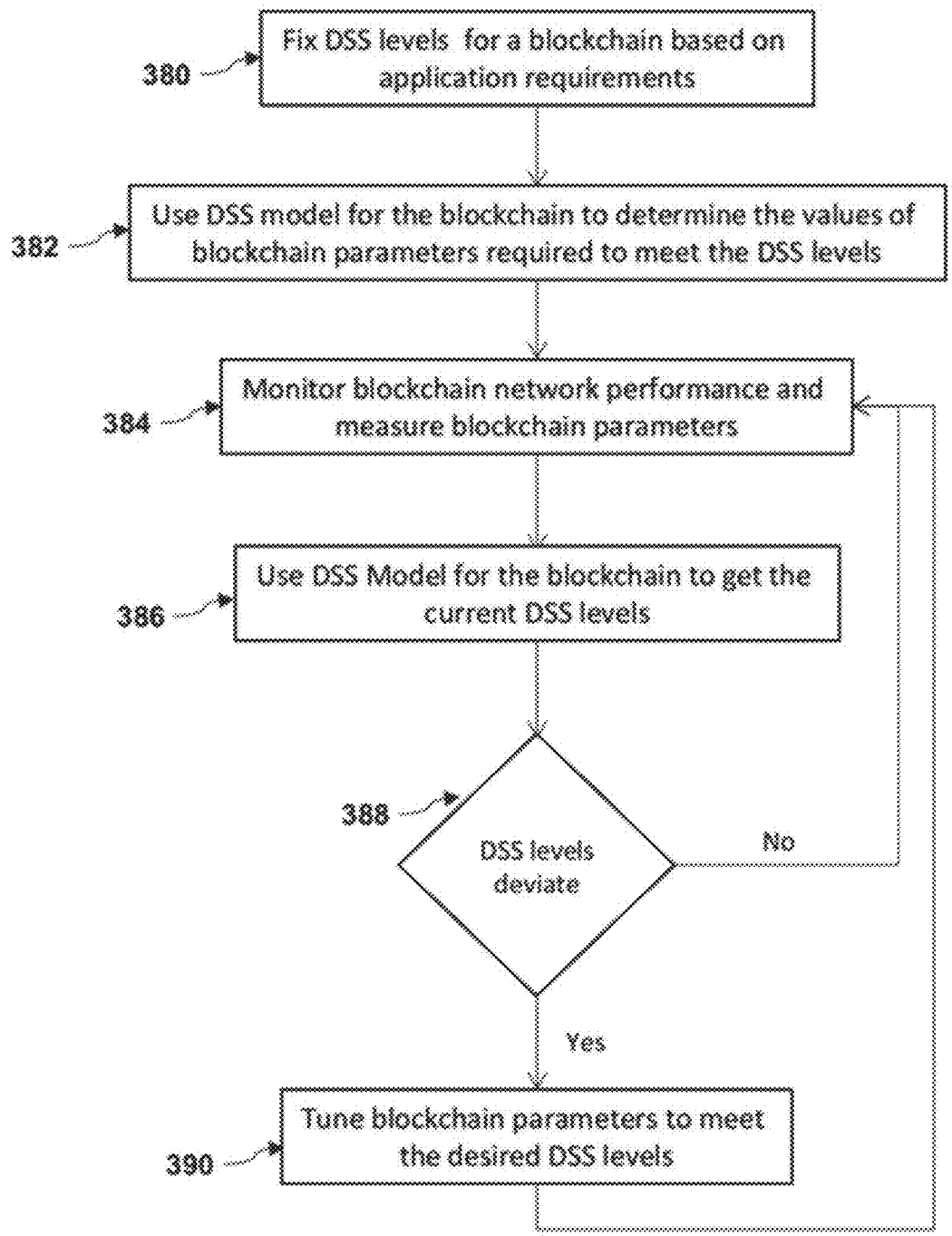
FIG. 7 is an illustration of a method for adaptive tuning of blockchain parameters, according to an embodiment of the invention.

Referring now to FIG. 7, a method aspect of the present invention for adaptive tuning of blockchain parameters, without significant client release updates, is described in more detail. The adaptive tuning method starts at step 380 with fixing the DSS levels for a blockchain based on application requirements. For example if a blockchain is to be used for applications requiring high transaction throughput, the scalability levels may be fixed to higher levels (such as 8-10) while the security and decentralization levels may be fixed to relatively lower levels (such as 4-6). Next, at step 382 use DSS model for the blockchain is used to determine the values of blockchain parameters required to meet the required DSS levels. Next, the blockchain can be setup with these values of blockchain parameters. Once the blockchain network is setup, the performance of the blockchain and its various metrics are monitored continuously, at step 384, through specialized control packets/messages that request Quality of Performance (QoP) values that are measured throughout the network, and based on this a decision can be made to initiate, stop, or rollback adaptive tuning processes, so that the system is efficient and consistent. At step 386 the target DSS levels may be identified from the DSS model for the blockchain network. At step 388, a check is performed if the DSS levels deviate from the desired levels. If the DSS levels deviate from the desired levels, the blockchain parameters are tuned, at step 390, to meet the desired DSS levels.

Figure 8:
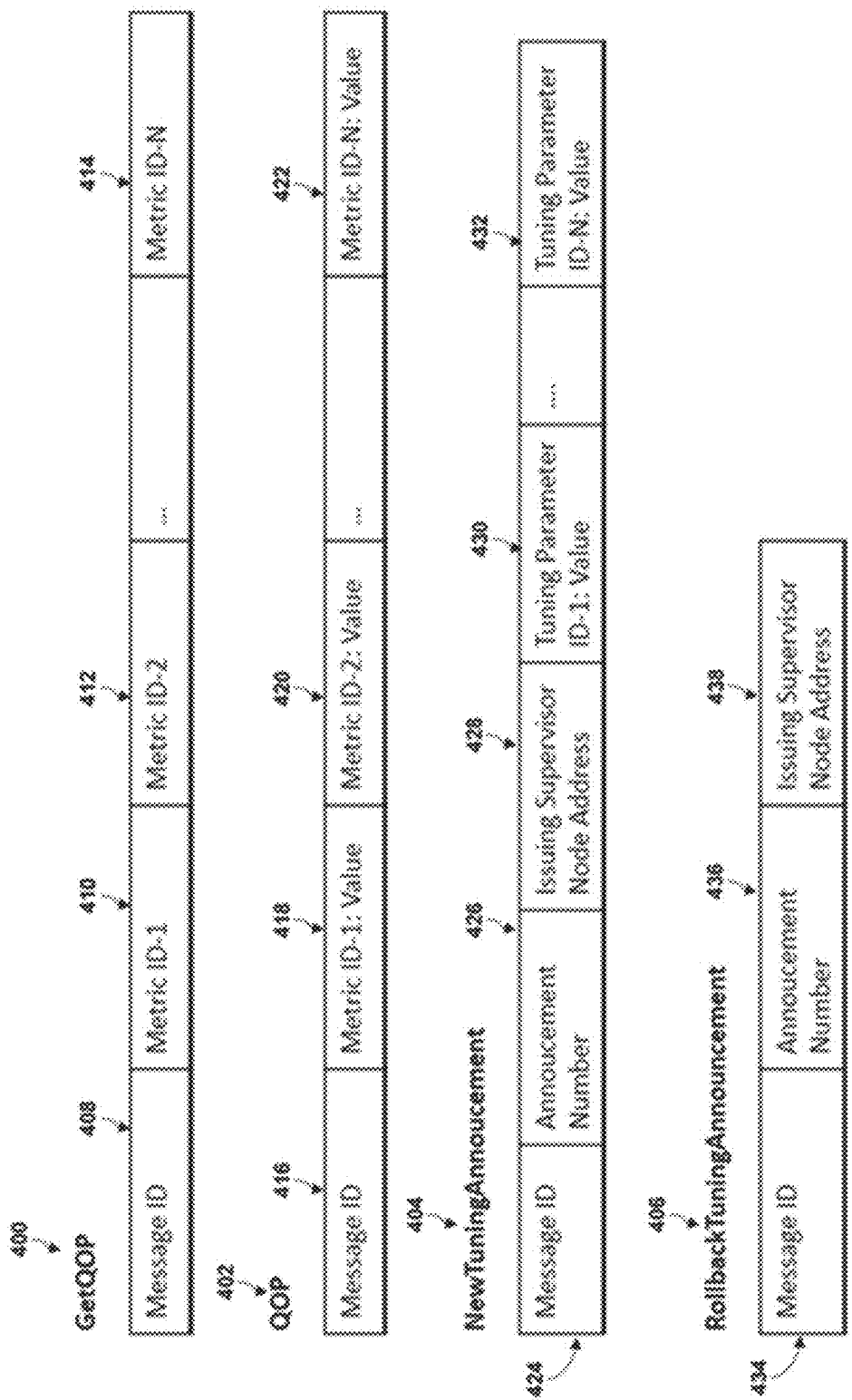
FIG. 8 is an illustration of the structure of control messages as extension to the existing Ethereum Blockchain Wire Protocol, according to an embodiment of the invention.

Referring now to FIG. 8, the structure of control messages as extension to the existing Ethereum Blockchain Wire Protocol, is described in more detail. The GetQoP message 400 may comprise a Message ID 408 and is used to request the QoP metrics for the specified metric-IDs 410, 412, 414. The response to a GetQoP message is a QoP message 402 which contains a Message ID 416, metric-IDs requested and their values 418, 420, 422. The DSS model is used at regular intervals of time to compute the current DSS levels. If the current DSS levels deviate from the desired levels, the blockchain parameters can be tuned to meet the desired DSS levels. If there exist timeouts or some other problems (message losses or network fragmentation/node failures) with implementation of the tuning update, the system can rollback to previous parameters sets that were check-pointed or stored (with in an incremental manner or in an absolute manner; a choice that is related to storage and security requirements).

An embodiment of the invention provides a system and associated methods for communicating the tuning parameters to the nodes in a blockchain network, so that the network can be tuned in an adaptive manner. We propose a set of nodes called the 'Supervisor' nodes in a blockchain network who supervise the tuning updates to the blockchain. The supervisor nodes hold a stake in the blockchain network. The stake can be in the form of a bond. The supervisor nodes monitor the blockchain network performance and decide how to adjust the blockchain parameters, based on the adaptive tuning approach described above. The parameter update announcements are issued after the supervisor nodes come to a consensus on the updates to be made to the parameters. Once the supervisor nodes come to a consensus on an update, one of the supervisor nodes is randomly chosen to create an announcement message. The announcement message is signed by the supervisor node's private key. The supervisor can also rollback or cancel the update to the last check-pointed state. These changes can be made as extensions to existing protocols, such as but not limited to Ethereum Wire Protocol, RLPx, Whisper, or SNMP and its variants. The NewTuningAnnoucement message 404 is used to announce an update to the tuning parameters. This message contains a Message ID 416, an announcement number 426, the address of the supervisor node issuing the announcement 428, and the tuning parameter IDs and the respective values 430, 432. To rollback an announcement or update to tuning parameters, a supervisor can issue a RollbackTuningAnnouncement 406 which contains a Message ID 434, the number of the announcement message 436, which is rolled back, and the issuing supervisor node address 438. We propose an enhancement to the existing blockchain wire protocols to allow the tuning announcement messages to be exchanged in a peer-to-peer blockchain network. The announcement messages are transmitted over the blockchain wire protocol (like other messages such as new block announcements). The underlying network and transport protocol allows the integrity of the announcement messages to be verified. Integrity verification is performed by recovering the public key from the signature and matching it with the expected value, for instance. The nodes in a blockchain network may continue to process the transactions while the announcement messages are propagated through the network. While these messages are being propagated, some miner nodes may use old tuning parameters for creating new blocks, whereas other miner nodes who received the announcement messages will use the latest announced blockchain parameters. This may lead to short forks being created on each new announcement. These forks are resolved when the next block is mined and the blocks using older parameters are ignored. Alternatively, the transactions may be halted for a period of synchronization before resuming. Suitable checkpointing methods may be used to rollback for any inconsistent application of parameters, or other faults and timeouts.

Figure 9:
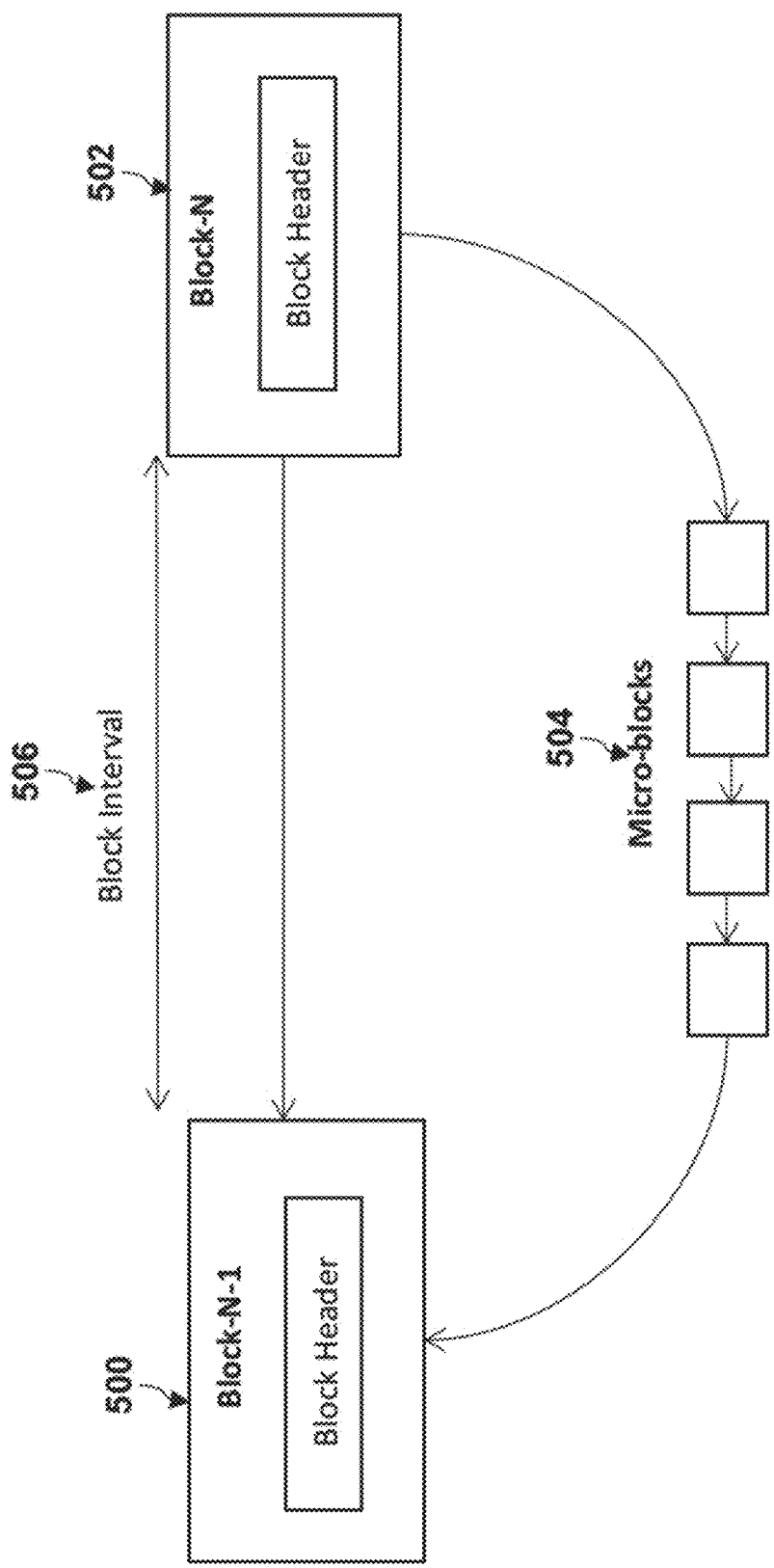
FIG. 9 is an illustration of blockchain design for increasing scalability (on-chain approach), according to an embodiment of the invention.

Referring now to FIG. 9, a method aspect of the present invention for on-chain scaling is described in more detail. A blockchain design comprising two types of blocks—normal blocks and microblocks, is presented. Normal blocks such as 500, 502 are created by the miners on the blockchain network and require proof-of-work mining separated by a block interval 506. A block is cryptographically secured by a nonce that proves that a certain amount of work was done to find the nonce input to the PoW algorithm. The normal blocks represents an eventually consistent state of the network, or points of consensus in the network. Micro-blocks, such as 504, are generated in the block-interval between two normal-blocks. Micro-blocks are created by a bonded-validator chosen by the network. There is no mining involved in creation of micro-blocks. The validator chosen after each normal block is created, generates micro-blocks by validating the transactions received after the creation of the last normal block and updates the state. Since no proof-of-work computation is involved, micro-blocks can be created at a very fast rate. Micro-blocks increase transaction throughput and reduce transaction latency in a blockchain network. The micro-block size and micro-block interval can be tuned. The structure of normal blocks is similar to the blocks in existing second generation blockchain networks such as Ethereum.

Figure 10:
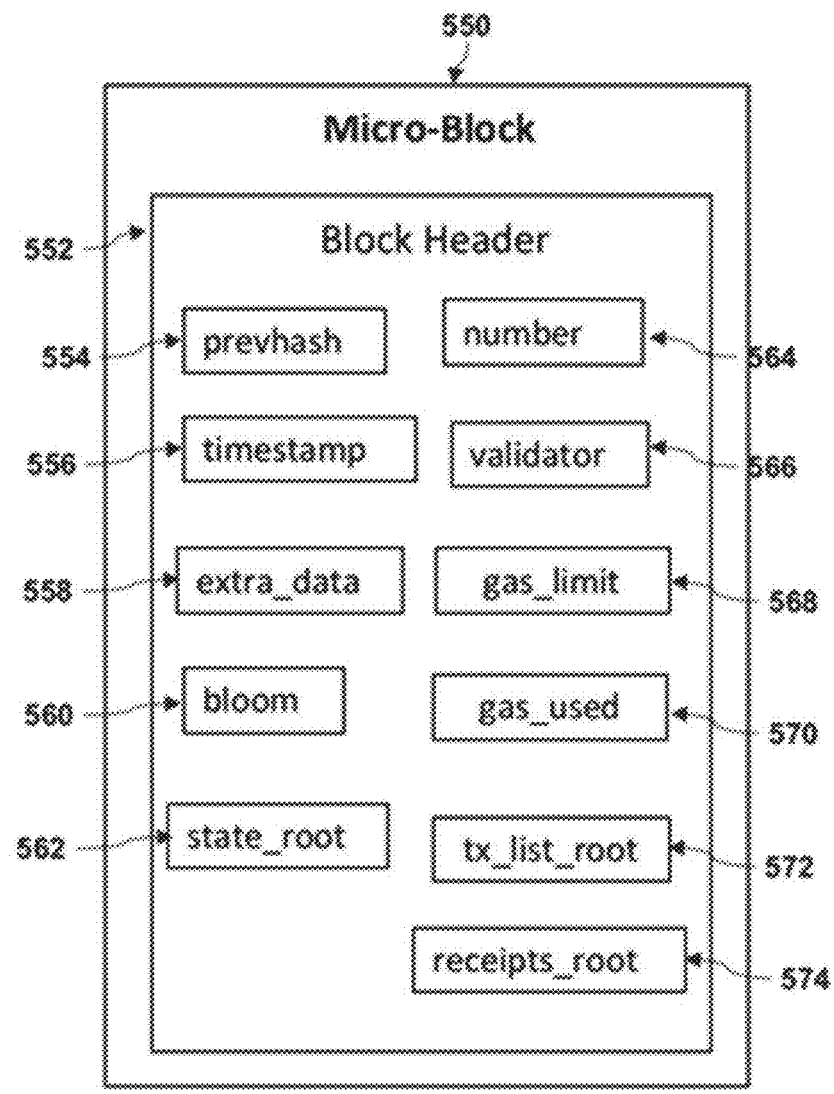
FIG. 10 is an illustration of the structure for a micro-block in the on-chain scaling approach, according to an embodiment of the invention.

Referring now to FIG. 10, the structure of an exemplary microblock 550 and the fields 552 in a microblock are described in more detail as follows:

Micro-Block Number (number) 564: This is the number of the micro-block.

Timestamp (timestamp) 556: This is the UNIX timestamp value at the creation of the block.

Parent Hash (prevhash) 554: Hash of the parent block header. Validator Address (address): This is the address of the account the validator who created the micro-block.

Gas Limit (gas_limit) 568: The gas limit value is the limit of gas expenditure for the block.

Gas Used (gas_used) 570: This is the total gas used for all the transactions in the block.

Extra Data (extra_data) 558: Optional 32-byte extra data can be provided in the block.

State Root (state_root) 562: This is the 32 byte hash of the root of the block's state tree after the transactions are executed.

Transactions List Root (tx_list_root) 572: This is the 32-byte hash of the root of the block's transaction tree which is populated with the transactions in the block.

Receipts Root (receipts_root) 574: This is the 32-byte hash of the root of the block's receipts tree which is populated with the receipts of the transaction in the transactions list of the block.

Bloom Filter (bloom) 560: Bloom filter composed from the set of logs created through execution of the transactions in the block.

Microblocks are generated by a 'bonded-validator' chosen by the network. Each validator owns a 'stake' in the network in the form of a bond or security-deposit. The validators who post a bond, or in other words, make the security deposit, are called 'bonded validators'. Given a point of consensus (i.e. a block at a certain height), a validator is randomly selected and assigned the right to create micro-blocks till the next block is mined. The higher the security deposit made by a validator, higher is its probability of being chosen to create the micro-blocks. Validators earn 10 rewards to validating transactions in micro-blocks. Any malicious validator who tries to cheat the network and vote for a microblock with invalid transactions loses its deposit and the right to generate new microblocks.

Figure 11:
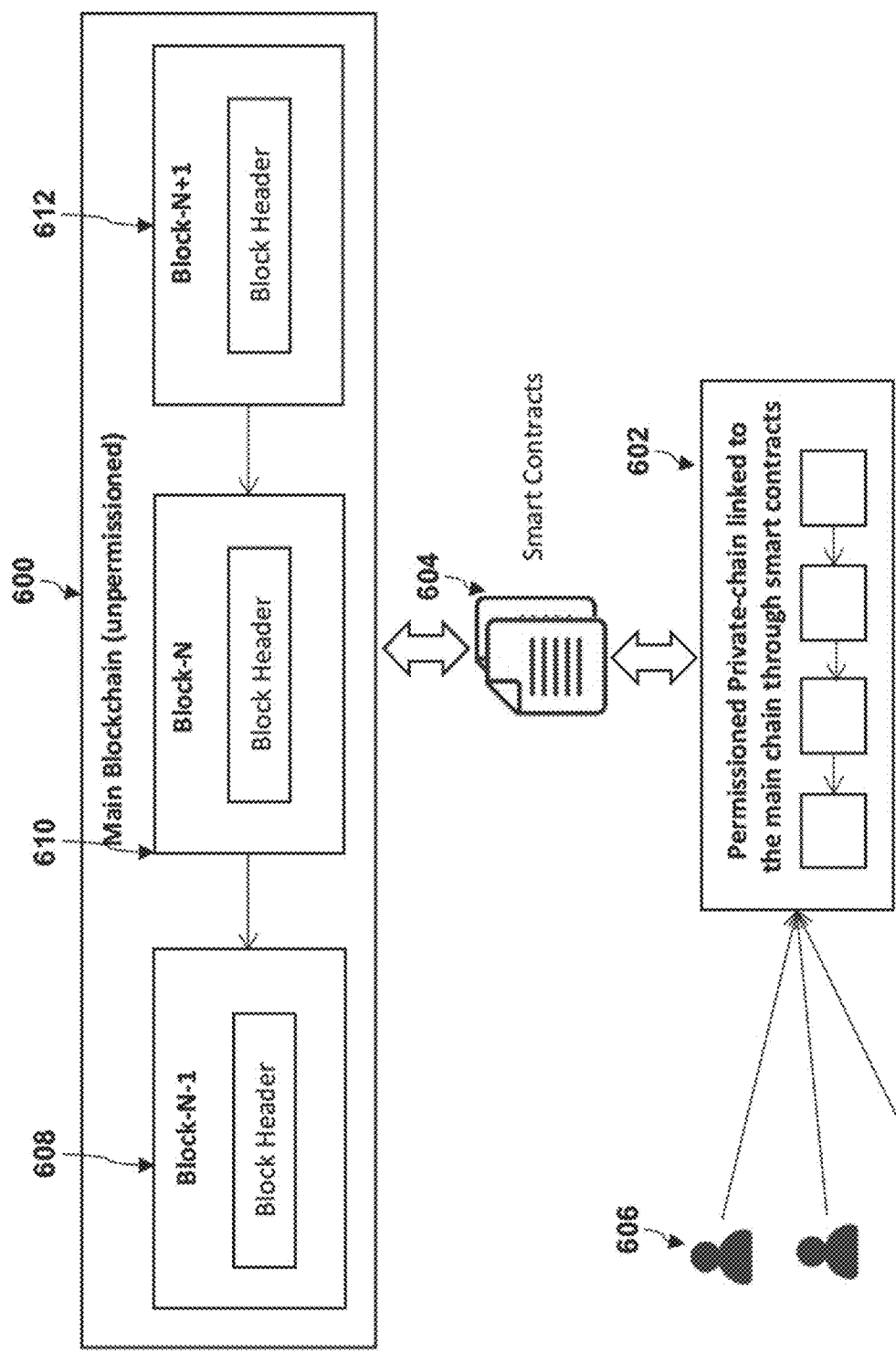
FIG. 11 is an illustration of an off-chain scaling approach, according to an embodiment of the invention.

Referring now to FIG. 11, an off-chain scaling approach, is described in more detail. An embodiment of the invention provides a system, protocol, and associated methods for off-chain scaling of a blockchain network 600. The off-chain scaling method involves one or more permissioned private chains or sub-chains 602 which are linked to the main blockchain through one or more smart contracts 604. The participants in the blockchain network who need to transact frequently can register themselves on such a private and transact directly with each other rather than sending transactions through the main blockchain. The consensus mechanism in a permissioned private chain is controlled by a pre-selected set of nodes. Due to the permissioned model of consensus in a private chain, the consensus mechanism is much faster than the main blockchain. As a result, a private chain can enable micro-transactions between the participants which can be processed much faster. The state of a private chain is regularly checkpointed to the main blockchain through the smart contracts. Thus the main blockchain serves as a 'summarized' or 'abstract' version of all the private chains linked to it. For example, a single transaction can be created on the main chain which captures the multiple micro-transactions on the private chain 608, 610, 612.

Figure 12:
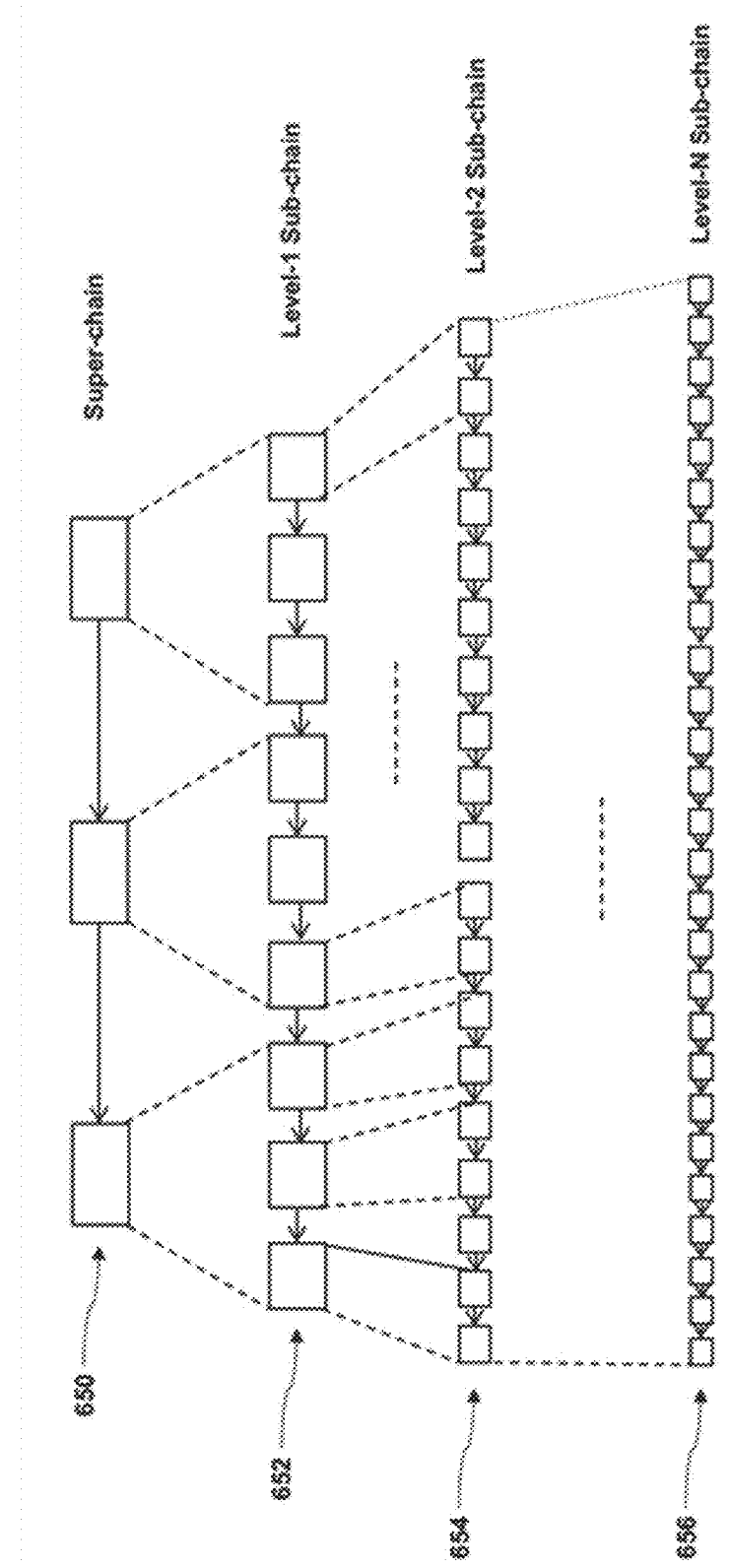
FIG. 12 is an illustration of super-chains and sub-chains as used in the off-chain scaling approach, according to an embodiment of the invention.

Referring now to FIG. 12, an illustration of super-chains and sub-chains as used in the off-chain scaling approach, is described in more detail. The off-chain scaling method involves one super-chain 650 and one or more levels of sub-chains 652, 654, 656. The super-chain acts as summarized version of the level-1 sub-chain. Similarly, level-(N−1) sub-chain acts as a summarized version of the level-N sub-chain. A single block in the super-chain can include summarized transactions from multiple blocks in the sub-chain. For example, for a retail blockchain application, a sub-chain can capture the sale of individual items (as micro-transactions) and the super-chain can capture a summary of all the transactions every hour, such that a single transaction is created every hour showing one summary sale of all the items sold in that hour. The DSS unified model can be used to tune to the super-chain and sub-chains to meet the application requirements.

Figure 13:
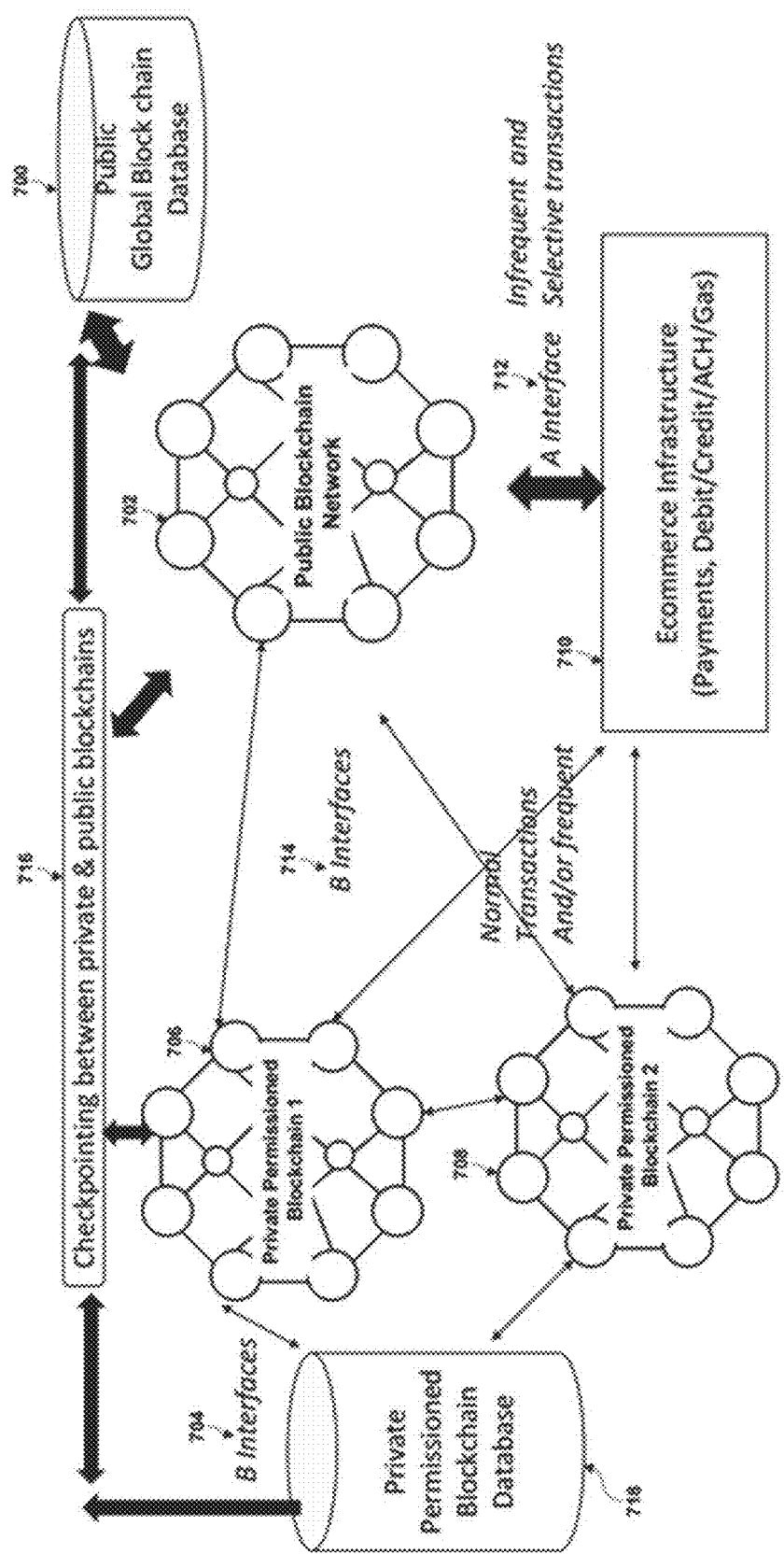
FIG. 13 is an illustration of the checkpointing process between private and public blockchains and the interfaces involved, according to an embodiment of the invention.

Referring now to FIG. 13, the checkpointing process between private and public blockchains and the interfaces involved, are described in more detail. Transactions are typically conducted on private permissioned blockchain networks 706, 708 that may share a global database 700 through a private blockchain database manager/network 718. Selected (and expensive/infrequent) transactions are checkpointed 716 on the public blockchain 702. The use of smart contracts allows suitable identification and processing of transactions in private or public blockchains and checkpointing at select times through use of policies that may be dynamically enforced. This approach improves the efficiency, speed and reduces the cost of transactions. The private permissioned blockchain networks 706, 708 may be used for multiple e-commerce applications, including trading, payments, HR, taxes, auctions, etc. Private permissioned blockchain networks 706, 708 carry out the majority of the smart contracts and other transactions on the B interfaces 714, while periodically checkpointing to the Public Blockchain 702 to synchronize some bulk/block transactions. This reduces the costs and tariff incurred if directly using the A Interface 712 for all transactions.

Figure 14:
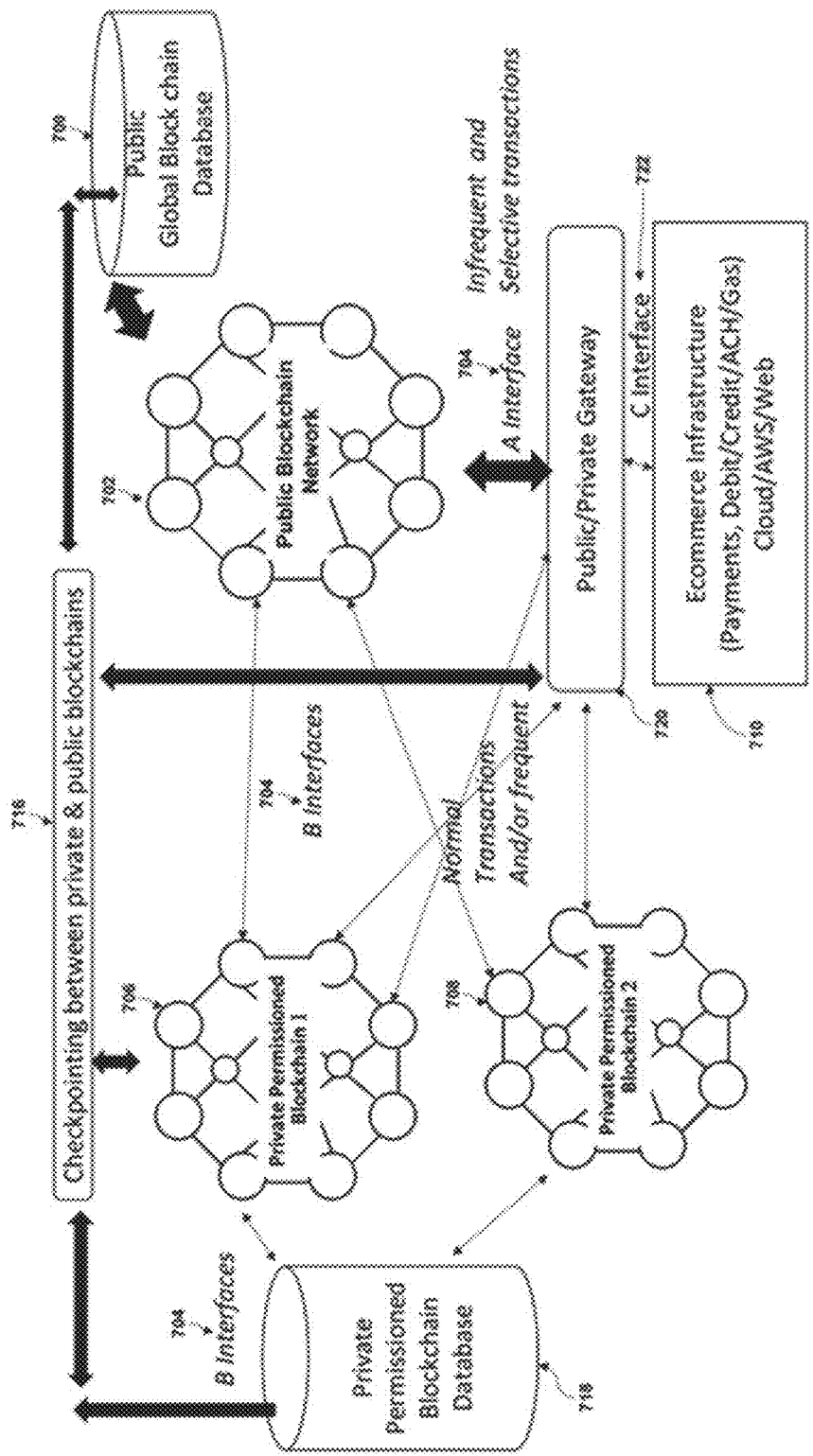
FIG. 14 is an illustration of checkpointing process between private and public blockchains with the use of a public-private gateway, according to an embodiment of the invention.

Referring now to FIG. 14, is an illustration of checkpointing process between private and public blockchains with the use of a public-private gateway, are described in more detail. In this model, a public-private gateway that interfaces with the e-commerce infrastructure 710 through the C Interface 722 and forwards the transactions to the public blockchain 702 over the A Interface 704.

Figure 15:
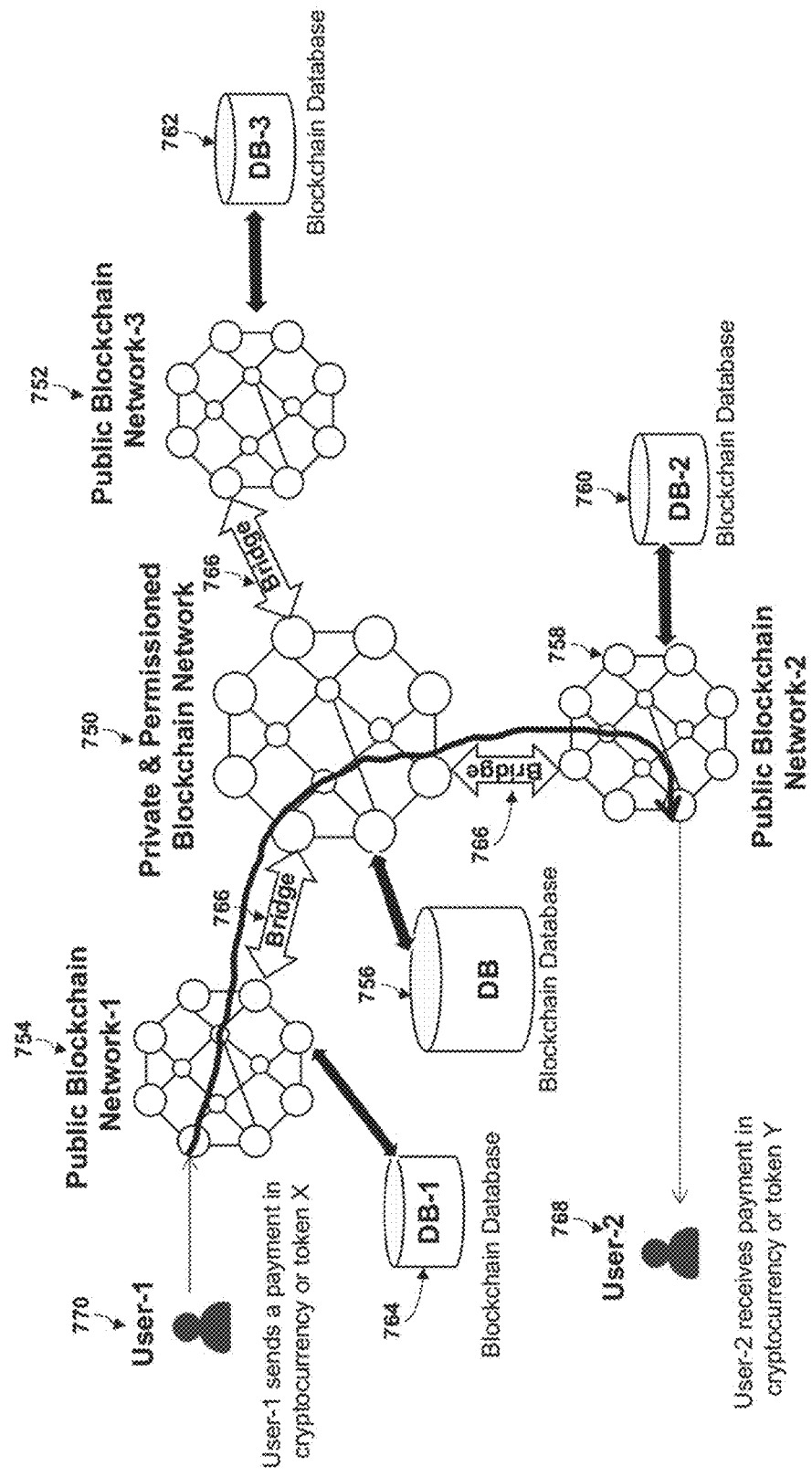
FIG. 15 is an illustration of a cross-chain payments process, according to an embodiment of the invention.

Referring now to FIG. 15, the cross-chain payments process, is described in more detail. In the scenarios illustrated in the figure, a User-1 770 having an account on a public blockchain network-1 754 sends a payment in a cryptocurrency or token on blockchain network-1 to User-2 768 who has an account on a public blockchain network-2 758. The public blockchain networks 754, 758, 752, each having an associated database 764, 760, 762, interface with a private blockchain network 750 and its database 756 through blockchain bridges. Bridges allow inter-chain blockchain transactions. A blockchain bridge 766 receives transactions from a public blockchain network and forwards the transactions to the connected private blockchain network. Similarly, the transactions received from a private blockchain network are forwarded to the connected private blockchain network.

Figure 16:
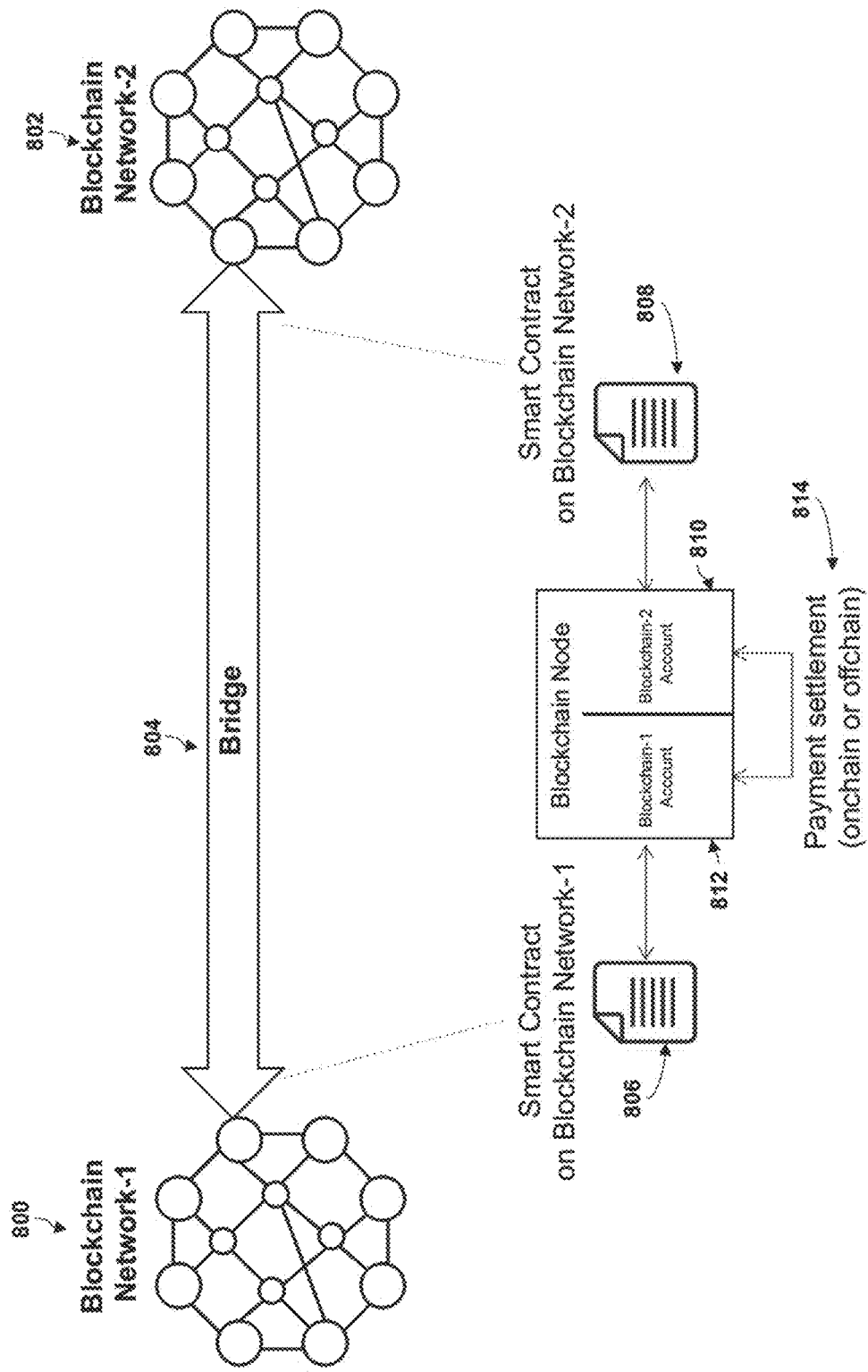
FIG. 16 is an illustration of interchain transactions and a payments bridge, according to an embodiment of the invention.

Referring now to FIG. 16, inter-chain transactions and payments bridge, are described in more detail. A bridge 804 connects two blockchain networks 800, 802 and allows transactions to be forwarded from one blockchain network to another. A bridge 804 may be implemented through a combination of blockchain accounts 812, 810, and smart contracts 806, 808, on the connected blockchain networks 800, 802, with on-chain or off-chain payment settlements 814 between the blockchain accounts.

Figure 17:
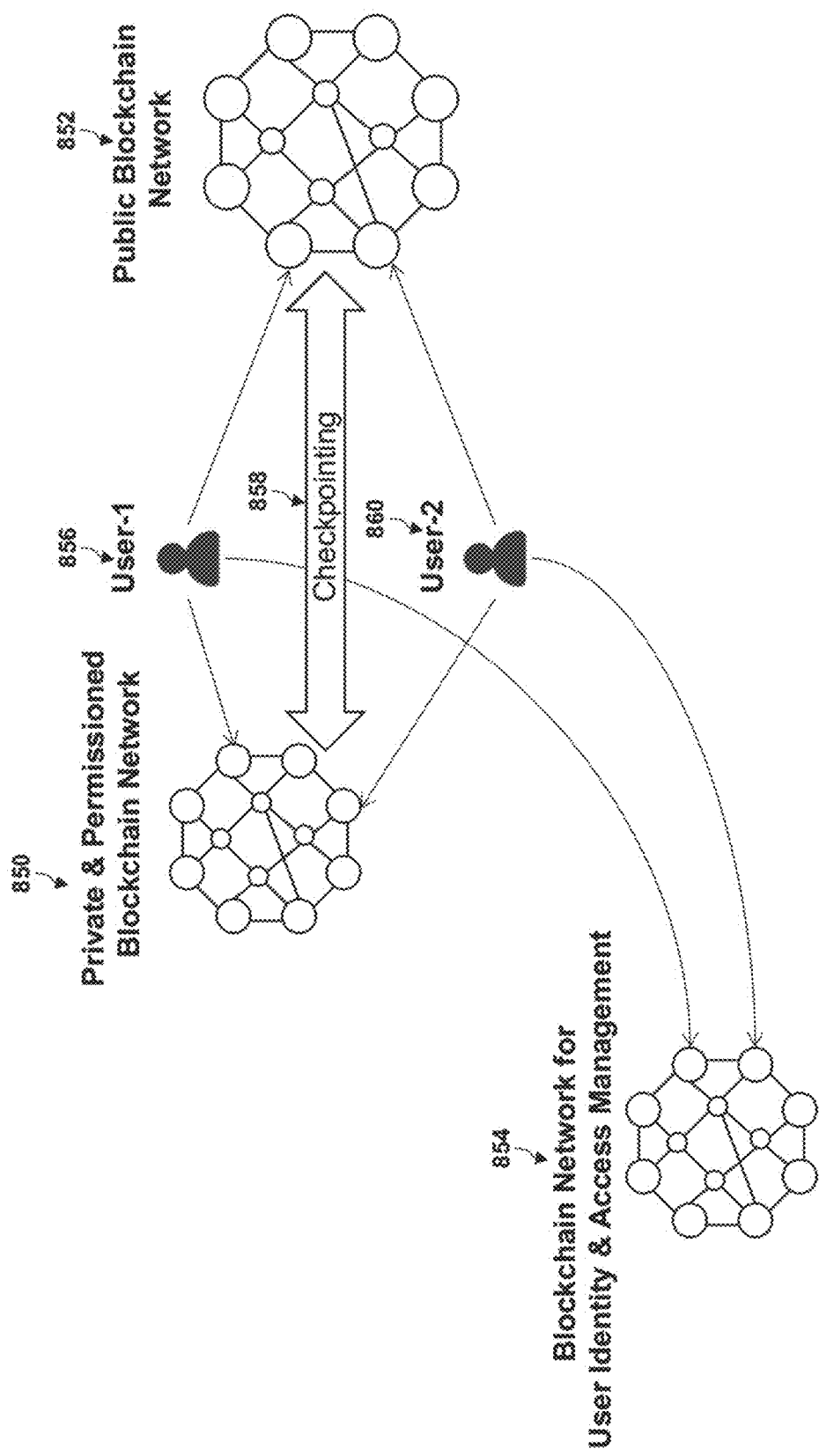
FIG. 17 is an illustration of fast and low cost transactions on a private blockchain network with periodic checkpointing on a public blockchain network, according to an embodiment of the invention.

Referring now to FIG. 17, an illustration of fast and low cost transactions on a private blockchain network with periodic checkpointing on a public blockchain network, is described in more detail. User-1 856 and User-2 860 have accounts on a private and permissioned blockchain network 850 and a public blockchain network 852. The private and permissioned blockchain network 850 is used for frequent transactions between the users 856,860. The transactions are processed fast and with low fees on the private and permissioned blockchain network 850. The transactions between the users 856,860 are checkpointed 858 on the public blockchain network 852 at regular intervals. During the checkpointing process, multiple transactions on the private and permissioned blockchain network 850 are combined into a single transaction and sent to the public blockchain network 852. A third blockchain network 854 may be may be used for user identity and access management.

Figure 18:
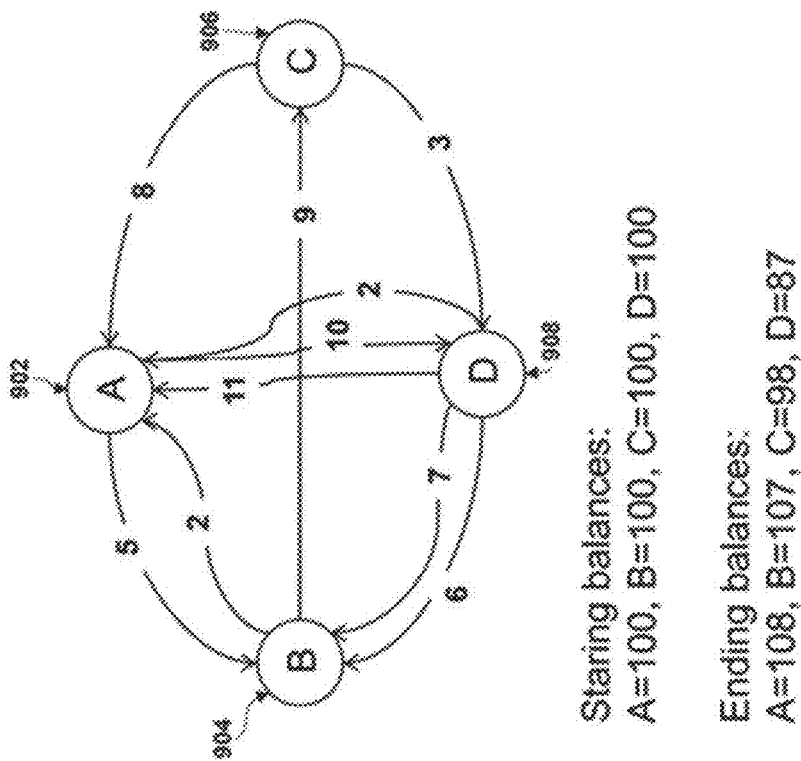
FIG. 18 is an illustration of an example of transactions processed on a private blockchain network (off the main public chain), according to an embodiment of the invention.

Referring now to FIG. 18, an example of transactions processed on a private blockchain network (off the main public chain), is described in more detail. User-A 902, User-B 904, User-C 906, User-D 908 all have starting balances of 100 (in a certain cryptocurrency or a token which can be transacted on a private blockchain network). The table 900 shows examples of transactions that transfer value between the users. After the transactions in table 900 are processed, the ending balance of the User-A is 108, User-B is 107, User-C is 98 and User-D is 87.

Figure 19:
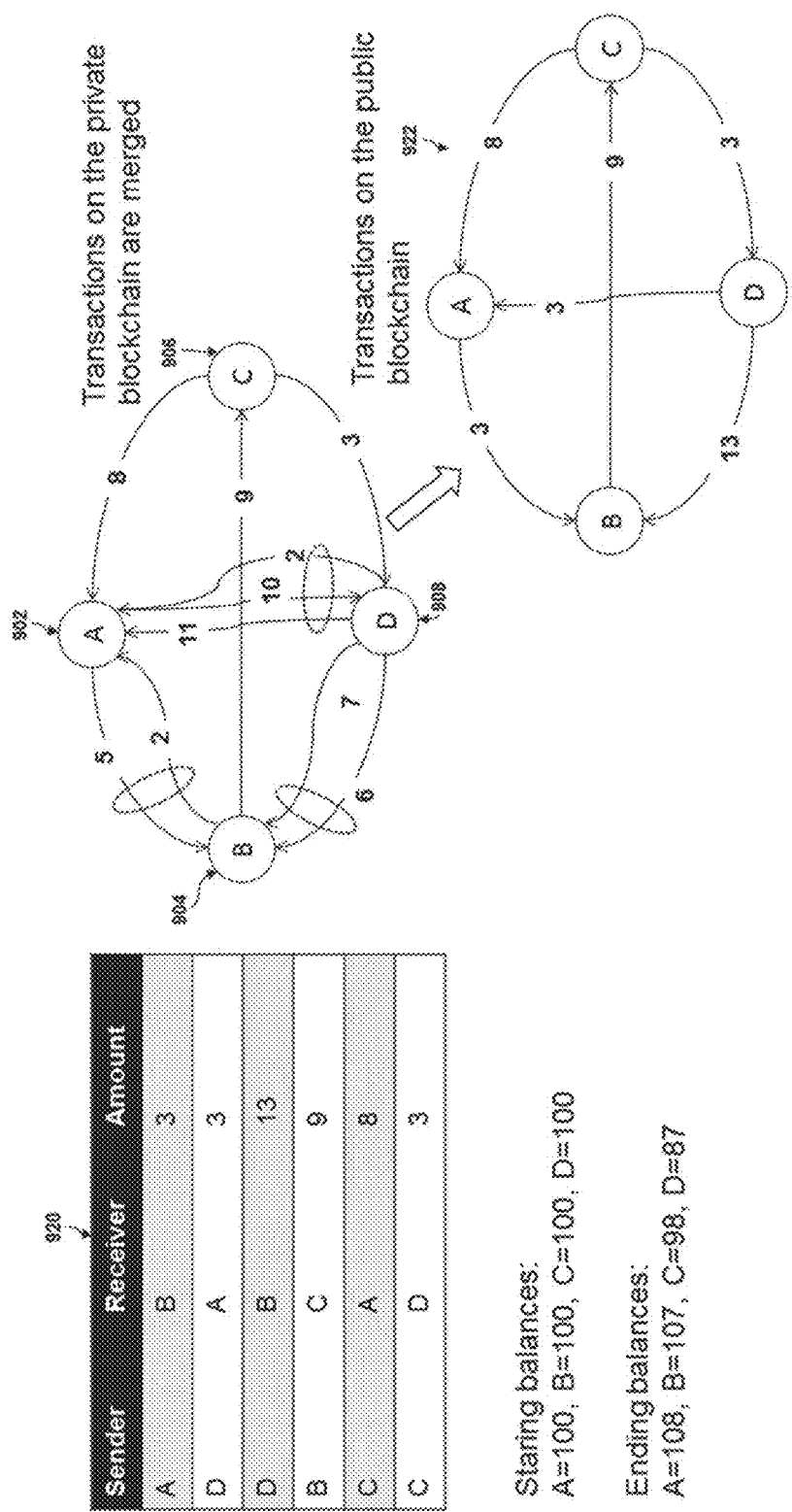
FIG. 19 is an illustration of an example of combined transactions processed on a public blockchain network, according to an embodiment of the invention.

Referring now to FIG. 19, and continuing to refer to FIG. 18, an example of combined transactions processed on a public blockchain network, is described in more detail. The transactions on the private blockchain network as shown in table 900, between the same pair of users are merged yielding a combined transactions 922. The merged transactions as shown in table 920 are sent to the public blockchain network. The values of the starting and ending balances of User-A 902, User-B 904, User-C 906, User-D 908 for the transactions processed on the private blockchain network are the same as the merged transactions processed on the public blockchain network. To prevent double spending from accounts participating in off the public chain transfers (i.e. transfers on the private chain), the accounts on the public blockchain can be locked in the time interval between two synchronization points of the private and public chains. This is to prevent the transfer of tokens from accounts on the public chain while there are unsynchronized transactions on the private chain. Smart contracts on the public blockchain can be used for locking the accounts and preventing transfer or withdrawal of tokens while there are unsynchronized transactions on the private chain.

Figure 20:
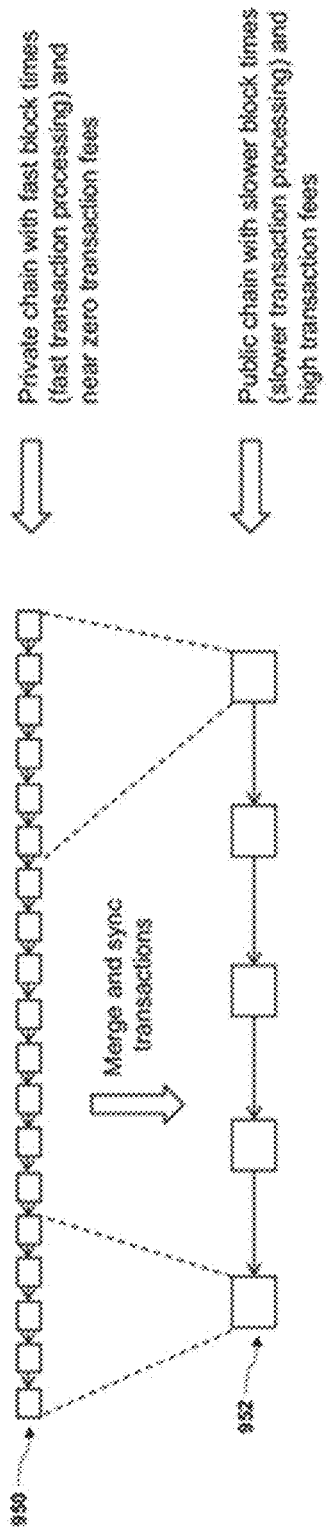
FIG. 20 is an illustration of an example synchronizing transactions between private and public blockchains, according to an embodiment of the invention.

Referring now to FIG. 20, an example synchronizing transactions between private and public blockchains, is described in more detail. Private blockchain network 950 has fast block generation time as a result the transactions can be processed very fast. The consensus mechanism on the private blockchain network 950 can be chosen such that the transaction can be processed with negligible or near zero fees. Public blockchain network 952 has slower block generation time as a result transactions are processed slower on the public blockchain. Public blockchain networks typically have high transaction fees. By merging multiple transaction on the private blockchain into a single transaction on the public blockchain, the effective fees paid per transaction can be lowered.

Figure 21:
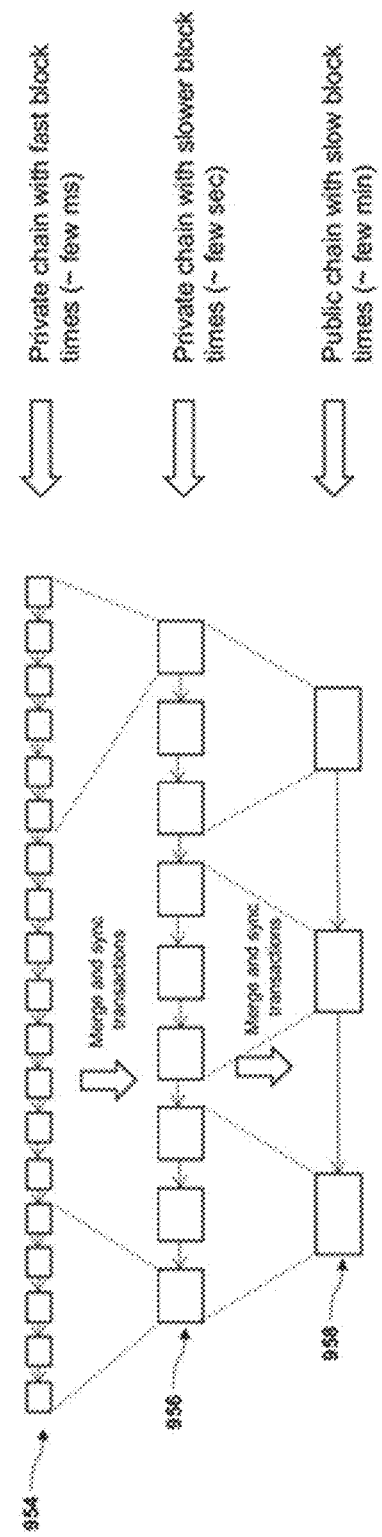
FIG. 21 is an illustration of an example synchronizing transactions between multiple private and public blockchains, according to an embodiment of the invention.

Referring now to FIG. 21, an example synchronizing transactions between multiple private and public blockchains, is described in more detail. The private blockchain network 954 has fast block generation time (of the order of few milliseconds) and the transactions are processed very fast. The transactions on the private blockchain network 954 (between the same pair of users and received in a given time interval) are merged and sent to the private blockchain network 956 which has slower block generation time (of the order of few seconds) than private blockchain network 954. The transactions on the private blockchain network 956 (between the same pair of users and received in a given time interval) are merged and sent to the public blockchain network 958 which has slow block generation time (of the order of few minutes) than private blockchain network 954.

Figure 22:
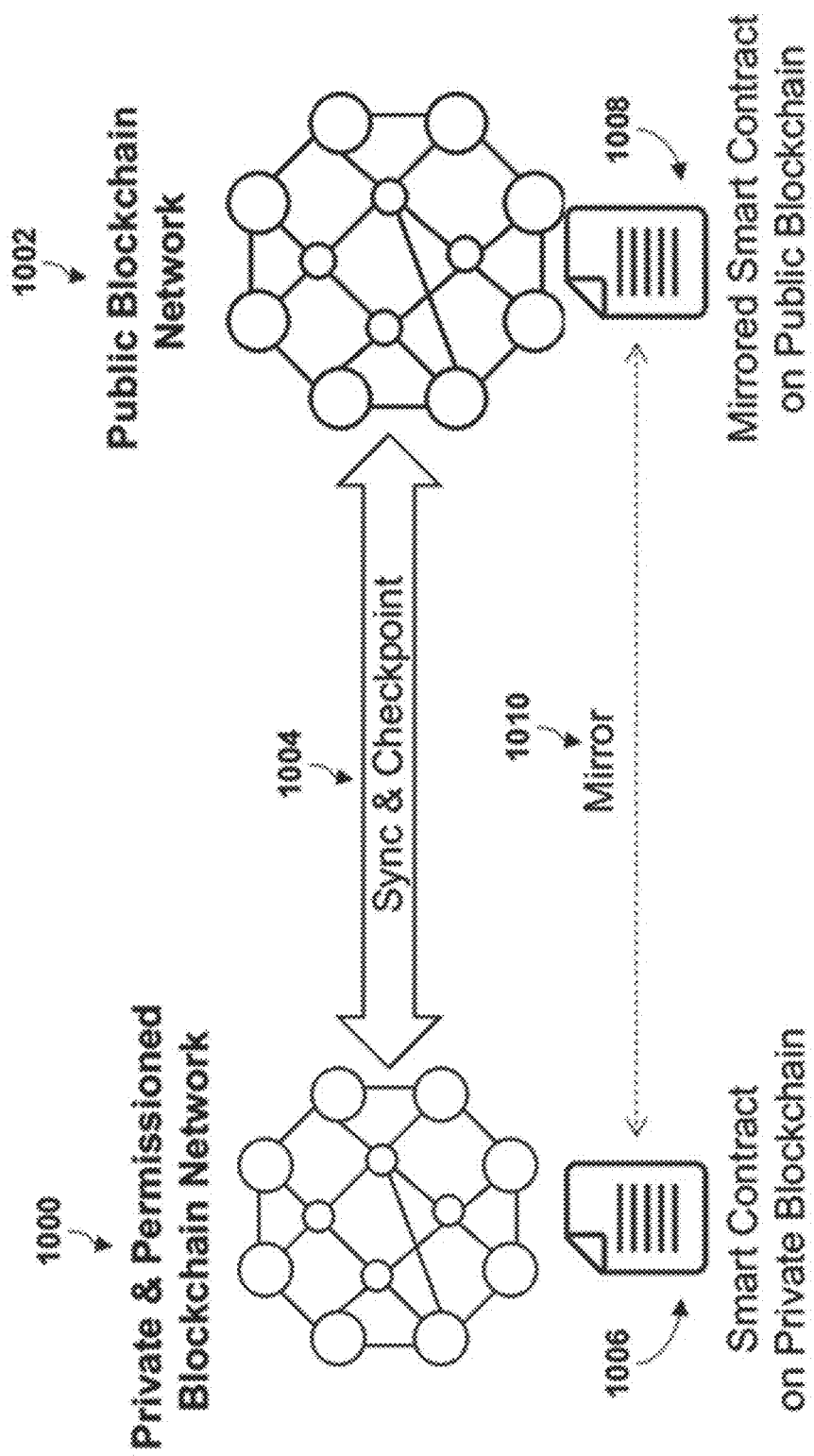
FIG. 22 is an illustration of a method of smart contract mirroring, according to an embodiment of the invention.

Referring now to FIG. 22, a method of smart contract mirroring, is described in more detail. The same smart contract (such as an ERC20 token contract) can be deployed on the private and public blockchain networks 1000, 1002. The smart contract 1006 on the private blockchain network 1000 is mirrored 1010 as the smart contract 1008 on the public blockchain network 1002 where the transactions on the private blockchain and periodically synchronized and checkpointed on the public blockchain network. The private blockchain network 1000 can process the transactions very fast and with near zero transaction fees. The transactions are periodically combined and sent in the public blockchain network 1002 thus synchronizing the smart contracts on the private and public chains. The sync and checkpointing process 1004 can be triggered at fixed time intervals (such as every few hours) or after fixed number of blocks on the private chain (e.g. after every 100 blocks on the private chain). Private blockchain network 1000 may adopt a different consensus algorithm (such as Proof of Authority or Delegated Proof of Stake) from the public blockchain network 1002.

Figure 23:
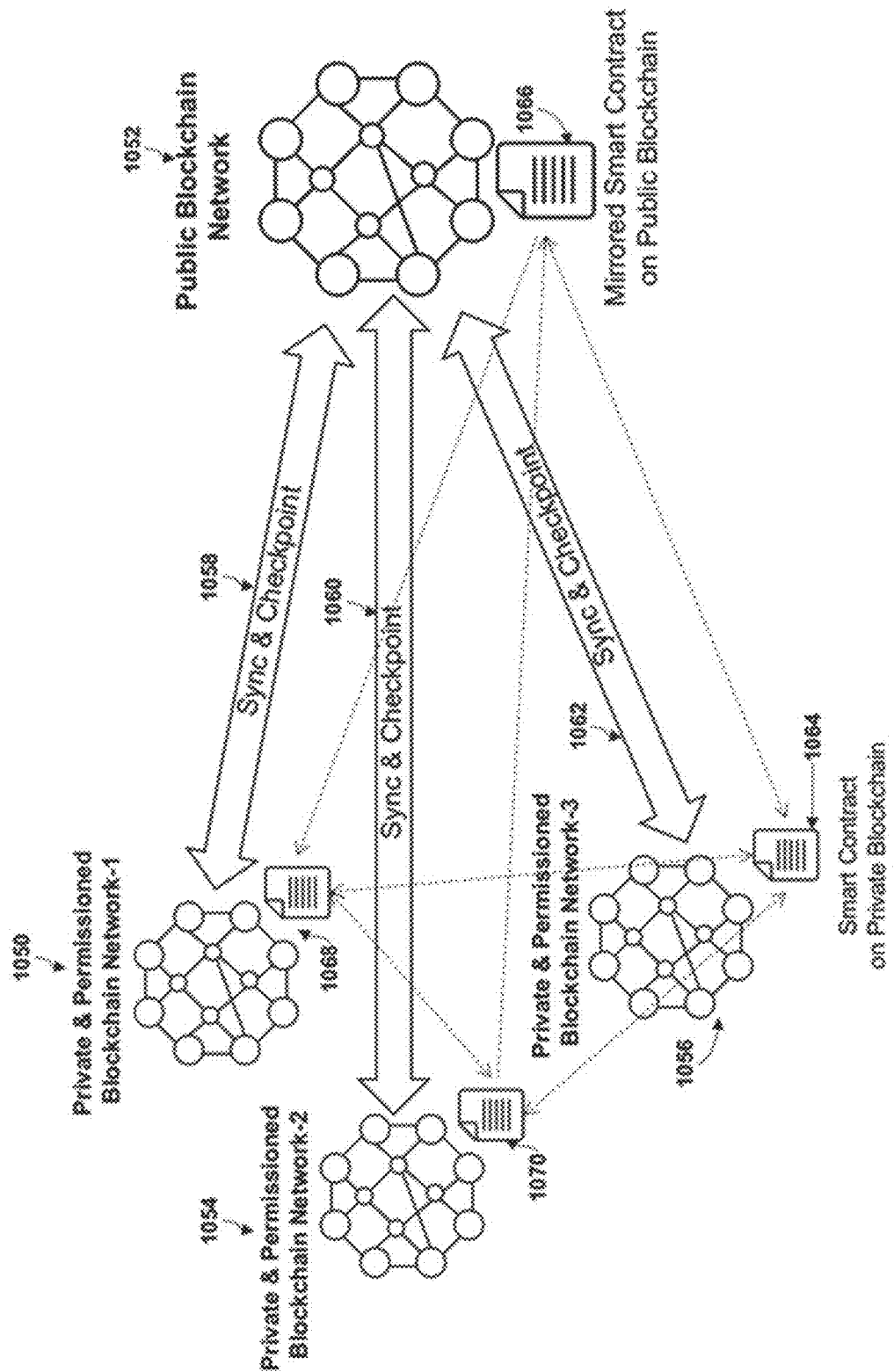
FIG. 23 is an illustration of the use of multiple chains for replication, partitioning and transaction speedup, according to an embodiment of the invention.

Referring now to FIG. 23, the use of multiple chains for replication, partitioning and transaction speedup, is described in more detail. Private and permissioned blockchain networks 1050, 1054, 1056 have the same smart contract deployed at addresses 1068, 1070, 1064 and mirrored to the smart contract 1066 deployed on the public blockchain network 1052. Multiple private and permissioned blockchain networks are used for the purposes of replication, partitioning and transaction speedup. For example, in a payment application, all transactions between a subset-1 of users can be processed on private and permissioned blockchain network 1050, whereas transactions between another subset-2 of users can be processed on the private and permissioned blockchain network 1054, thus partitioning the transaction processing for the payment application across two blockchain. Another use of having multiple private and permissioned blockchain networks 1050, 1054, 1056 to process transactions for an application is that while one network is being synchronized and checkpointed 1058, 1060, 1062 with the public blockchain network 1052, the transactions can be sent to the other private blockchain network to prevent double spending.

Figure 24:
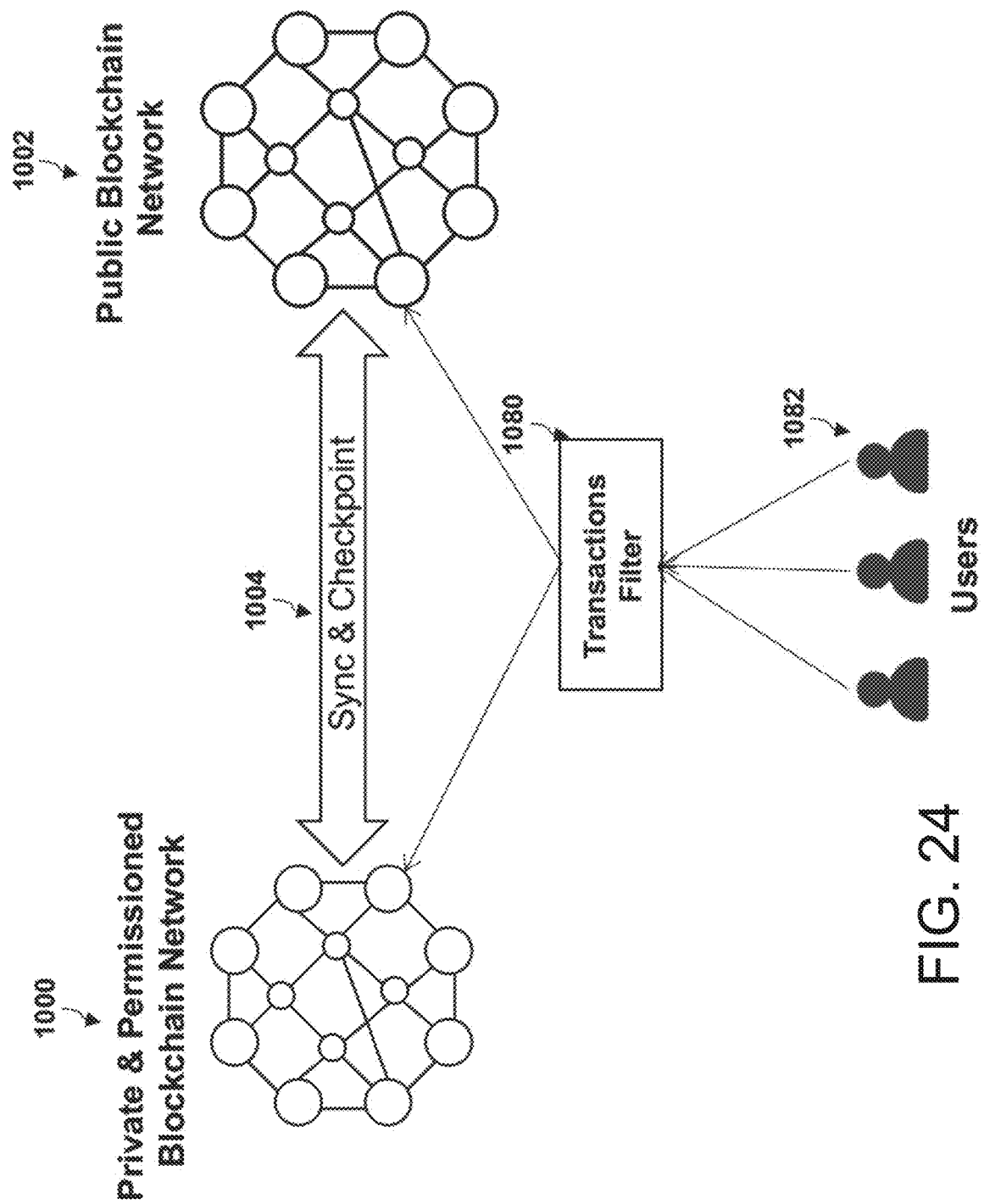
FIG. 24 is an illustration of a transactions filter for filtering transactions into different classes, according to an embodiment of the invention.

Referring now to FIG. 24, a transactions filter for filtering transactions into different classes, is described in more detail. Transactions sent by users 1082 between private blockchain networks 1000 and public blockchain networks 1002 that are synced and checkpointed 1004 are filtered by a transactions filter 1080 based on the transaction value, sender and receiver information, source of transaction and other meta-data associated with the transaction. The transaction filtering process can segregate the transactions into different classes such as follows:

Class 1: Small value transactions are completed on private blockchain with no syncing.
Class 2: Large value transactions are synced immediately.
Class 3: Other transactions will be synced in batch mode.
Class 4: Transactions which seem suspicious are be sent for additional processing.

Figure 25:
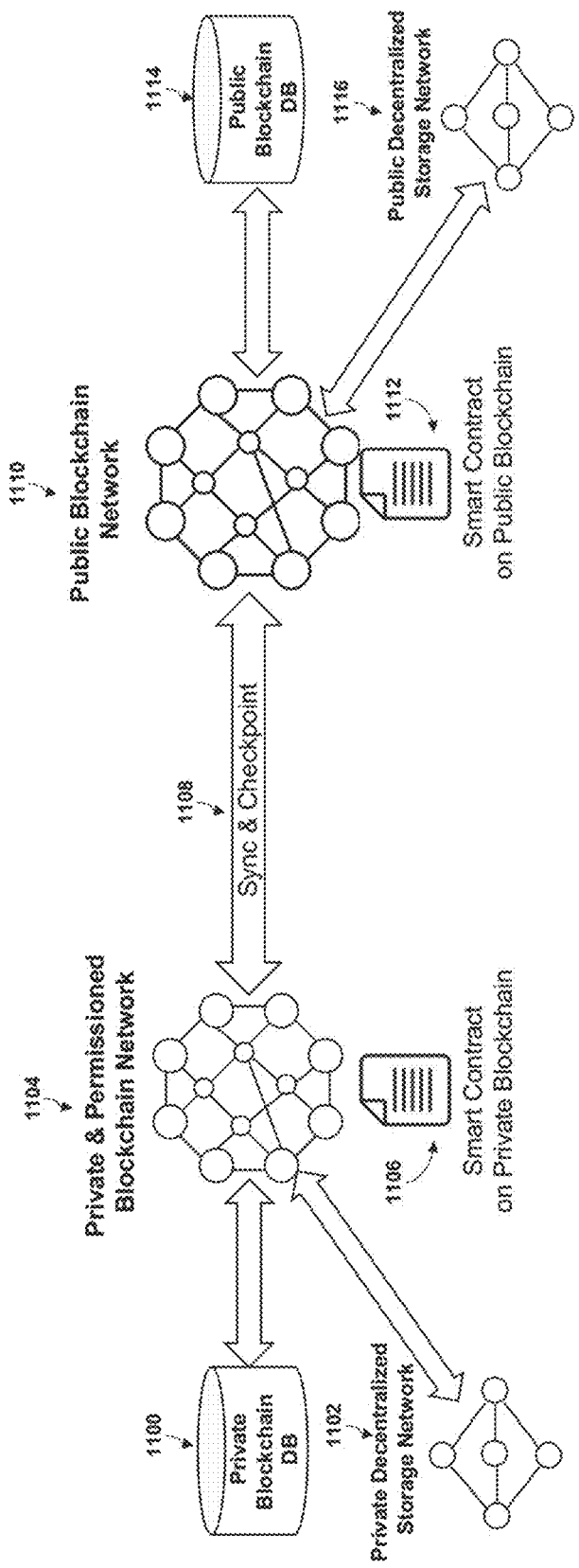
FIG. 25 is an illustration of the use of a private blockchain infrastructure for offloading frequent transactions and big data, according to an embodiment of the invention.

Referring now to FIG. 25, the use of a private blockchain infrastructure to offload frequent transactions and big data, is described in more detail. Since blockchain and smart contracts are not designed to store large amounts of data and big files, such information can be stored on a decentralized storage platform (such as IPFS or Swarm). In this approach, while the data is stored off the blockchain within a storage platform, the hash of the data (which is used to uniquely identify the data) is stored on the blockchain as state variables within a smart contract. The benefit of this approach is that while standardized data fields can be stored as state variables in a smart contract, the abstract data types and large files can be stored off the blockchain and pointers to the data (content-hash) stored with the smart contracts 1106, 1112. For scaling and speeding up applications that involve frequent transactions between users or devices (such as IoT applications) or applications that involve large amounts of data (such as healthcare applications), a private blockchain infrastructure comprising a private blockchain network 1104, a private blockchain database 1100 and a private decentralized storage network 1102 is used. While the private blockchain infrastructure is used for offloading frequent transactions and big data, a public blockchain infrastructure comprising a public blockchain network 1110, a public blockchain database 1114 and public private decentralized storage network 1116 is used for combined or important or summarized transactions and data. Data can be synchronized and checkpointed 1108 between the private and public blockchain networks 1104, 1110.

Figure 26:
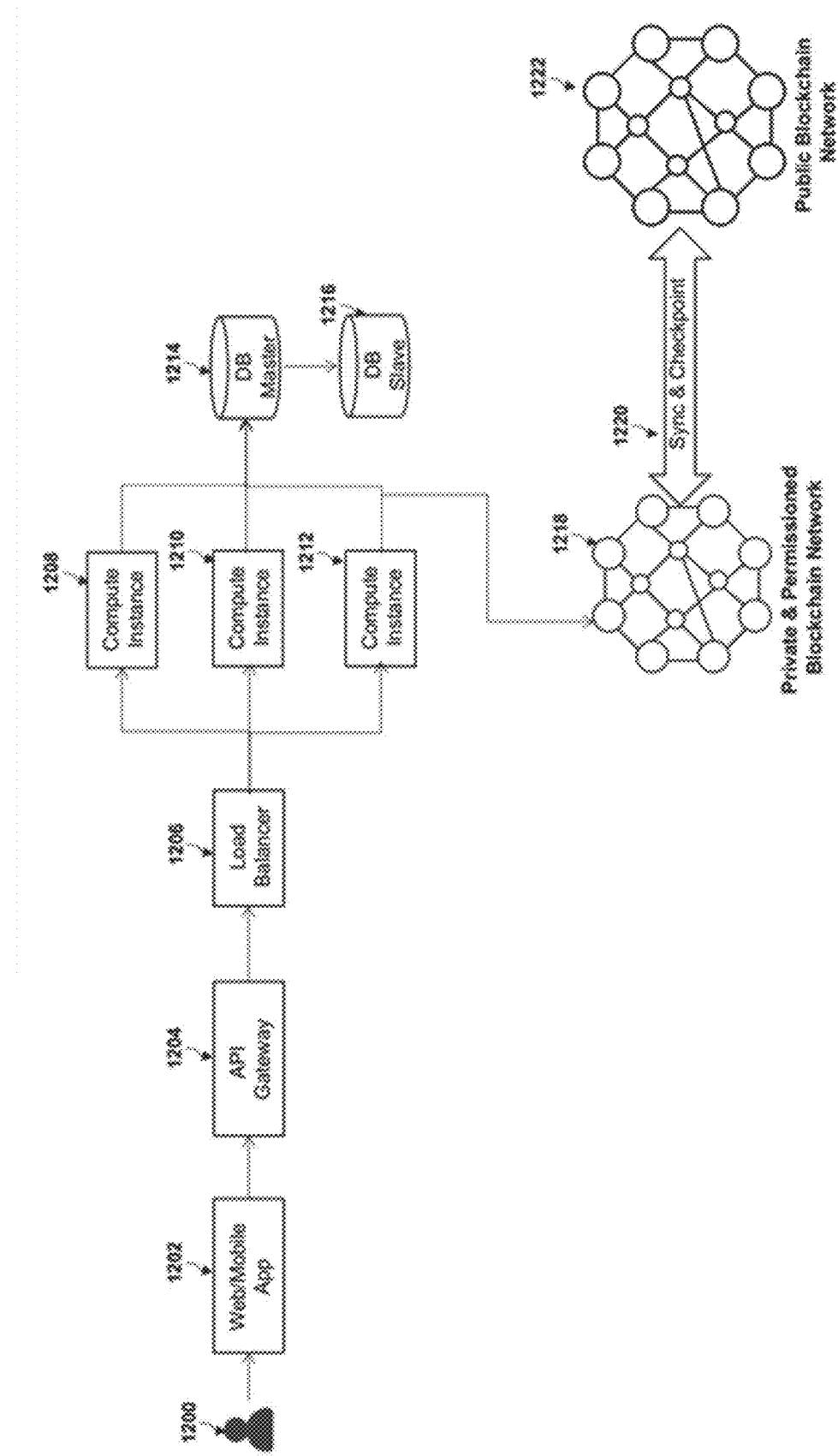
FIG. 26 is an illustration of an exemplary cloud and blockchain backend architecture for a payments application, according to an embodiment of the invention.

Referring now to FIG. 26, an exemplary cloud and blockchain backend architecture for a payments application, is described in more detail. Users 1200 can access the payment application through a mobile or web application 1202 which communicates with the application backend (cloud and blockchain) through APIs. The access to the backend APIs is controlled through the API gateway 1204. A number of compute instances 1208, 1210, 1212, under one load balancer 1206 may run the application servers. The application data is stored in a replicated master-slave database comprising a master database instance 1214 and a slave database instance 1216. The application servers process the API requests (such as for transfer of tokens on the blockchain) and post transactions to a private blockchain network 1218. To enable the application servers to communicate with the private blockchain network 1218, the compute instances on which such application servers run also have blockchain client applications installed. The blockchain transactions and the state of smart contracts are synchronized and checkpointed 1220 on the public blockchain network 1222 at regular time intervals. The advantages of using an architecture as illustrated in FIG. 25 are as follows:

Web and mobile applications do not have to be aware of the blockchain platform being used. The web and mobile applications (which are themselves deployed on a server or local machine or device) need not run blockchain clients and synchronize the complete blockchain state to process the blockchain transactions.

Transactions can be processed much faster on the private blockchain. The combined transactions and the state of the smart contracts on the private blockchain can be synchronized and checkpointed with the public blockchain at regular intervals in an asynchronous manner without the users having to wait for the transactions to be processed.

The API gateway may use a cache to serve data which is requested frequently (such as balances of blockchain accounts or smart contract state variables).

The compute instances that run the application servers and blockchain clients may be placed under an auto-scaling group to enable the backend system to scale-up or down automatically based on demand.

The database system maintains records of user and transactions data and serves requests from the application servers. This allows users to efficiently query for data such as history of all transactions, user profile data and other application specific data that need not be stored on the blockchain.

Figure 27:
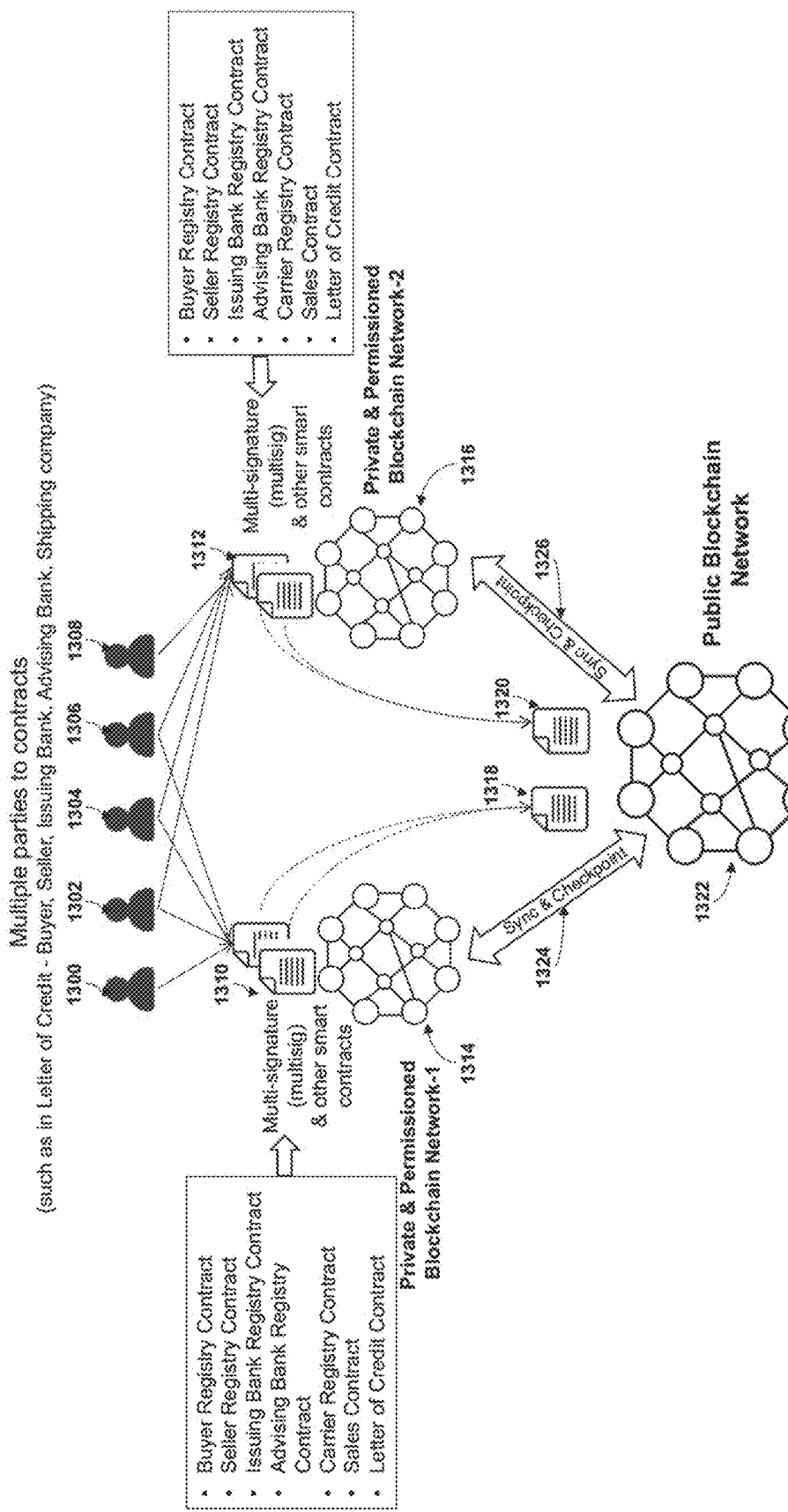
FIG. 27 is an illustration of multi-signature and multi-party smart contracts on multiple private and permissioned blockchains which are synchronized and checkpointed to a single public blockchain, according to an embodiment of the invention.
Figure 28:
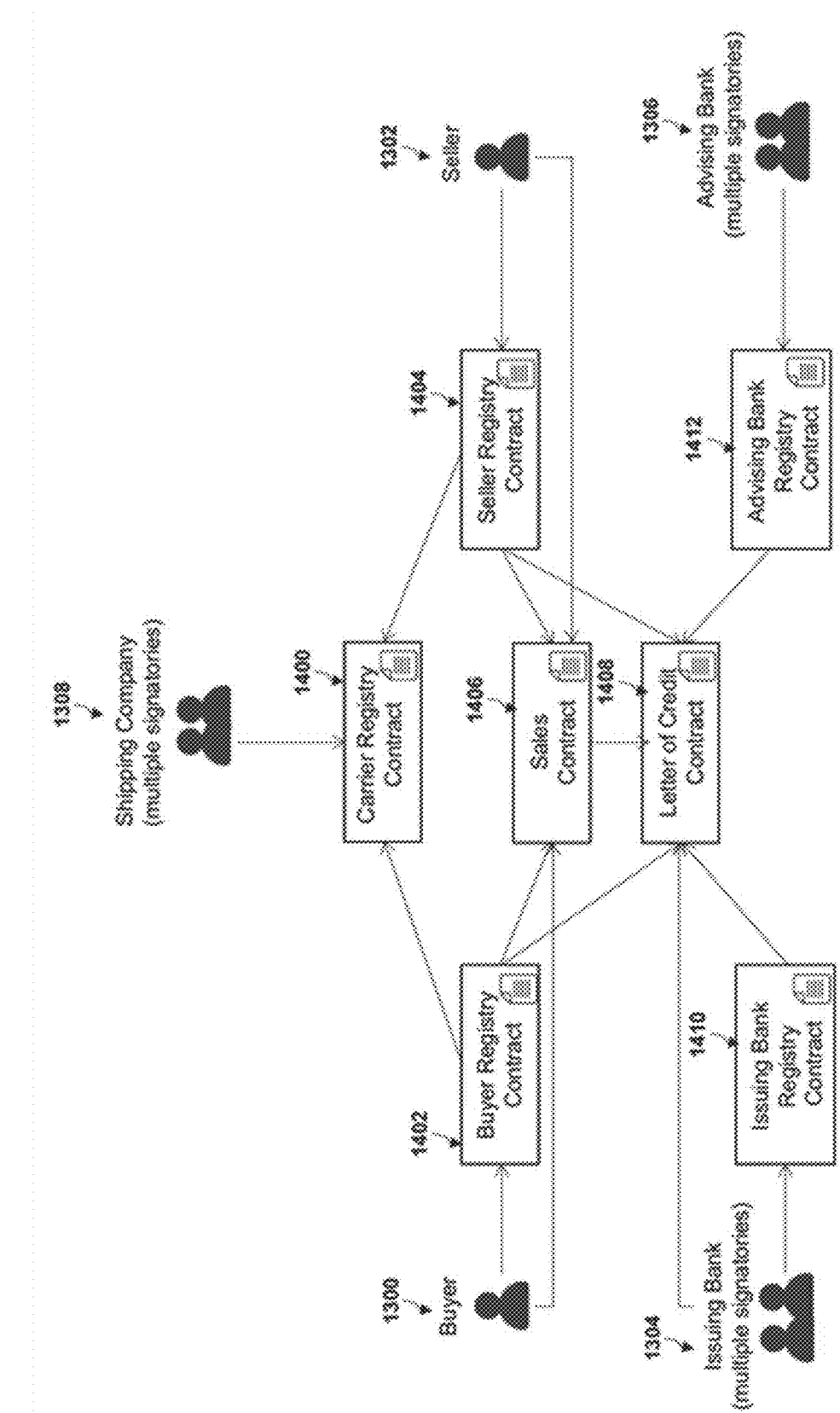
FIG. 28 is an illustration of the multi-signature and multi-party smart contracts in a Letter of Credit application, according to an embodiment of the invention/

Referring now to FIG. 27 and additionally referring to FIG. 28, the use of multi-signature and multi-party smart contracts 1310, 1312 on multiple private and permissioned blockchains which are synchronized and checkpointed 1324, 1326 to a single public blockchain and associated smart contracts 1318, 1320, are described in more detail. Applications involving multiple parties to smart contracts 1300, 1302, 1304, 1306, 1308, (for example, in the case of a trade process that involves Letter of Credit (LC) or Standby Letters of Credit (SBLC) contracts between the parties to the trade) can leverage private and permissioned blockchain networks 1314, 1316 for improving scalability, speeding up transactions, and reducing transaction processing fees. Each party is represented on the blockchain through a registry smart contract. For example, in a trade process that involves the use of Letter of Credit, the parties include a buyer, seller, issuing bank, advising bank and shipping company. These parties are represented on the blockchain through registry contracts such as Buyer Registry Contract 1402, Seller Registry Contract 1404, Issuing Bank Registry Contract 1410, Advising Bank Registry Contract 1412, Carrier Registry Contract 1400, Sales Contract 1406, Letter of Credit Contract 1408.

The multi-signature (multisig) smart contracts 1310, 1312 on the private and permissioned blockchain networks 1314, 1316 require multiple parties to sign various transactions sent to these contracts (i.e. M-of-N signatures, such as 1-of-2, 2-of-2, 2-of-3, 3-of-5, 5-of-9). The state of the multisig contracts is synchronized and checkpointed in the equivalent or simplified contracts 1318, 1320 on the public blockchain network 1322.

The smart contracts capture different steps involved in the trade process and the interaction between the parties. For example, in the Letter of Credit application, the Buyer and Seller have a Sales contract between them. The Issuing Bank sends a Letter of Credit contract to the seller. The Seller ships the goods through the Shipping company and records the shipping information in the Shipping contract. The Seller gets a transport verification message (or documents) which are sent to the Advising bank. The Advising bank sends the transport verification message (or documents) to the Issuing Bank. The Issuing Bank releases the payment and sends the transport verification message (or documents) to the buyer. The buyer takes possession of the goods from the shipping company by presenting the transport verification message (or documents) to the shipping company. In this application the smart contracts allow easier and faster verification of information. The transactions to update the state of smart contracts and messages are cryptographically signed by the concerned parties. Suitable checks in the Letter of Credit and related smart contracts can prevent reuse of the Letter of Credit. Requiring multiple signatures for certain smart contracts (such as Letter of Credit smart contract), can prevent fraud (for example, a bank employee fraudulently issuing a Letter of Credit without verifying buyer's financial standing or collateral). Furthermore, each party involved is aware of the state of the contracts leading to greater transparency in the whole trade process.

Unlike the simplified existing implementations of Letter of Credit smart contracts on a blockchain network or multisig contracts [References: https://qithub.com/sunil-qunasekaran/Letter_Of_Credit/tree/master/LOC/contracts http://github.com/haribalaii79/letterofcredit_blockchain], the technique here does the following:

- The smart contracts are structured as multi-party and multi-signature contracts and deployed on private and permissioned blockchain network. The state of the such contracts is synchronized and checkpointed in the equivalent or simplified contracts on the public blockchain network.
- Offloading the smart contracts on a private and permissioned blockchain network improves scalability, speeds up transactions, and reduces transaction processing fees.
- For different trades, different private and permissioned blockchain networks may be used. The state of the smart contracts on such multiple private and permissioned blockchain networks can be synchronized and checkpointed on a single public blockchain network.
- The private and permissioned blockchain networks may have a different consensus mechanism from the public blockchain. For example, a Proof-of-Stake or Proof-of-Authority consensus may be used on private and permissioned blockchains whereas the public blockchain may use a Proof-of-Work consensus mechanism.
- The identity information of each party may be maintained on a separate blockchain network. An identity verification and certification procedure is performed for securely linking blockchain accounts to real users.
- Smart contracts may have multiple variants (for example multiple variants of a Letter of Credit contract) and a particular variant of a smart contract may be selected based on additional meta-data available (for example, trade process meta-data such as the countries of the buyer and seller or type of trade).

The identity (and associated blockchain accounts) of each party involved in such contracts may be separately verified through an identity verification process. A system and associated methods for securely linking blockchain accounts to real users, as described in related U.S. patent application Ser. No. 15/863,128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure is performed that comprises receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 29:
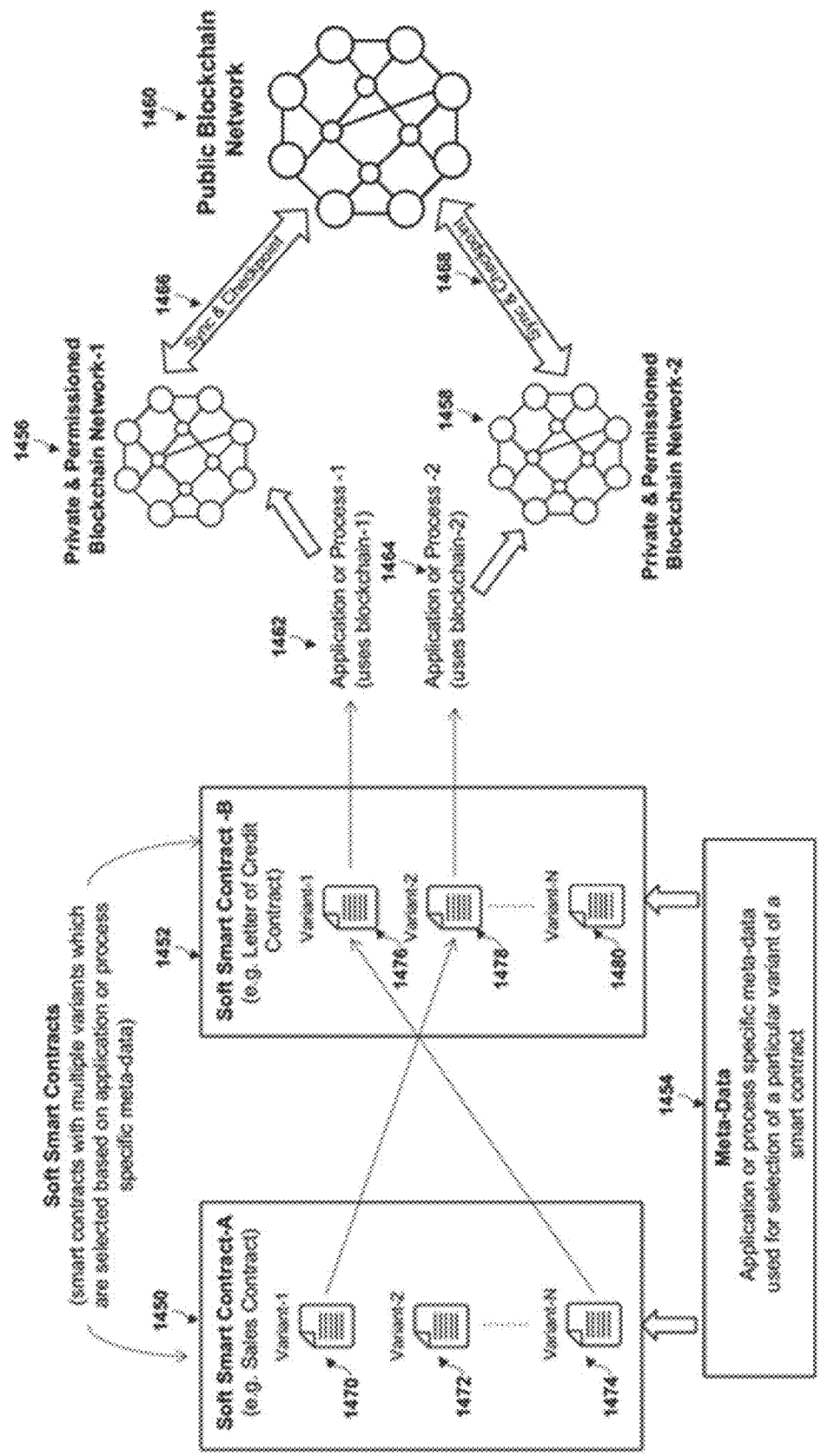
FIG. 29 is an illustration of "soft" smart contracts, according to an embodiment of the invention.

Referring now to FIG. 29, an illustration of "soft" smart contracts, is described in more detail. Soft smart contracts are contracts which have multiple variants (for example multiple variants of a Letter of Credit or Sales contract) and a particular variant of a smart contract may be selected based on additional application or trade specific meta-data available (for example, trade process meta-data 1454 such as the countries of the buyer and seller or type of trade). FIG. 29 illustrates a Soft Smart Contract-A 1450 which has multiple variants of smart contracts (Variant-1 1470, Variant-2 1472, Variant-N 1474) and a Soft Smart Contract-B 1452 which has multiple variants of smart contracts (Variant-1 1476, Variant-2 1478, Variant-N 1480). For Application/Process-1 1462, Variant-1 1470 of Soft Smart Contract-A 1450 and Variant-2 1478 of Soft Smart Contract-B 1452 are used. For Application/Process-2 1464, Variant-N 1474 of Soft Smart Contract-A and Variant-1 1476 of Soft Smart Contract-B are used. The selection of a particular variant of a soft smart contract is done based on application or process specific meta-data 1454. The smart contracts for Application/Process-1 1462 are deployed on private and permissioned blockchain network-1 1456. The smart contracts for Application/Process-2 1464 are deployed on private and permissioned blockchain network-2 1458. The state of the smart contracts on the private and permissioned blockchain networks 1456, 1458 are synchronized and checkpointed 1466, 1468 in the equivalent or simplified smart contracts the public blockchain network 1460.

Figure 30:
FIG. 30 is a reference implementation of a token smart contract synchronizing service that syncs token smart contracts between a private blockchain and a public blockchain, according to an embodiment of the invention.

Referring now to FIG. 30, a reference implementation of a token smart contract synchronizing service that syncs token smart contracts between a private blockchain and a public blockchain, is described in more detail. The contract syncer service can be run periodically (after few hours or once every day) to sync two token smart contracts deployed on private and public blockchain networks. The syncer service takes as input a list of all accounts on the private that transacted during the day with the token contract. The syncer service syncs the smart contract states by performing the following steps:

STEP-1: For all accounts whose token balance has decreased on the private chain as compared to the last synced balance on public chain, move the difference in balance from the corresponding account on public chain to a vault account on public chain.

STEP-2: If the total token supply on the private chain has increased since the last synced balance on public chain, create new tokens (equal to the difference of total token supply on private and public chains) and send to vault account on public chain. Whereas, if the total token supply on the private chain has decreased since the last synced balance on public chain, burn tokens (equal to the difference of total token supply on private and public chains) from the vault account on public chain.

STEP-3: For all accounts whose token balance has increased on the private chain as compared to the last synced balance on public chain, move the difference in balance from the vault account on public chain to the corresponding account on the public chain.

Appendix-A provided shows the results of a simulation using the syncer service. In the simulation shown, there are five accounts which transact with the token contract. The transactions are of three types—(1) transaction to create tokens which are credited to an account, (2) transaction to burn tokens from an account, (2) transaction to transfer token from one account to another. Simulation results show transactions on the private chain and public chain, the token balances and total token supply. The state of the token contract on the private chain is synced with the state of the token contract on the public chain at midnight. Simulation results show that a 94% reduction in the number of transactions is achieved for syncing the token smart contract states on the private and public chains.

What is claimed is:

1. A method of synchronizing transactions between blockchains comprising:
   receiving a first plurality of transactions on a first private blockchain network;
   recording the first plurality of transactions to a first private block on the first private blockchain network;
   receiving a second plurality of transactions on the first private blockchain network;
   recording the second plurality of transactions to a second private block on the first private blockchain network;
   generating a first merged block comprising the first private block and the second private block;
   recording the first merged block to a single block on a second blockchain network;
   recording each of the first private block, the second private block, and the first merged block to a smart contract linked to the first private blockchain network, defining a first private smart contract; and
   performing a synchronization process between the first private smart contract and a second smart contract linked to the second blockchain network, defining a second smart contract, the synchronization process comprising:
      determining an account on the first private blockchain network that has a token balance decrease, defining a decreasing account;
      moving a value of the token balance decrease from an account on the second blockchain network corresponding to the decreasing account to a vault account on the second blockchain network;
      determining if a total token supply on the first private blockchain network has increased since an immediate previous synchronization process;
      if the total token supply on the first private blockchain network has increased, creating new tokens and sending them to the vault account;
      if the total token supply on the first private blockchain network has not increased, burning an amount of tokens from the vault account equal to the token balance decrease;
      determining an account on the first private blockchain network that has a token balance increase, defining an increasing account; and
      moving a value of the token balance increase from the vault account to an account on the blockchain network corresponding to the increasing account.

2. The method of claim 1 performing a checkpointing process between the first private smart contract and the second smart contract comprising recording the state of the first private smart contract to the second smart contract, defining a checkpointed first private smart contract.

3. The method of claim 1 wherein:
   the first plurality of transactions comprises a plurality of transactions between two users, each transaction between the two users comprising a transfer of tokens from one user to the other, each user having an account on each of the first private blockchain network and the second blockchain network; and
   the first merged block comprises a combined transaction comprising a net token value equaling the net of transfers of tokens between the two users in the plurality of transactions between the two users.

4. The method of claim 3 wherein the first private smart contract is a multi-signature smart contract comprising a plurality of signatures, each signature being associated with a user.

5. The method of claim 4 wherein an identity of a user having a signature comprised by the first private smart contract is validated by an identity verification and certification procedure.

6. The method of claim 5 wherein the identity verification and certification procedure comprises retrieving identity verifying information from an identity verification blockchain network.

7. The method of claim 4 wherein the first private smart contract comprises at least three signatures, each signature being associated with a separate user.

8. The method of claim 1 further comprising:
receiving a third plurality of transactions on a second private blockchain network;
recording the third plurality of transactions to a third private block on the second private blockchain network;
receiving a fourth plurality of transactions on the second private blockchain network;
recording the fourth plurality of transactions to a fourth private block on the second private blockchain network;
generating a second merged block comprising the third private block and the fourth private block;
recording the second merged block to a single block on the second blockchain network;
recording each of the third private block, the fourth private block, and the second merged block to a smart contract linked to the second private blockchain network, defining a second private smart contract; and
performing a synchronization process between the second private smart contract and the second smart contract.

9. The method of claim 8 further comprising performing a checkpointing process between the second private smart contract and the public smart contract comprising recording the state of the second private smart contract to the public smart contract, defining a checkpointed second private smart contract.

10. The method of claim 1 further comprising:
receiving a third plurality of transactions on a second private blockchain network;
recording the third plurality of transactions to a third private block on the second private blockchain network;
receiving a fourth plurality of transactions on the second private blockchain network;
recording the fourth plurality of transactions to a fourth private block on the second private blockchain network;
generating a second merged block comprising the third private block and the fourth private block;
recording the second merged block to a single block on the second blockchain network;
recording each of the third private block, the fourth private block, and the second merged block to a smart contract linked to the second private blockchain network, defining a second private smart contract; and
performing a synchronization process between the second private smart contract and a second smart contract linked to the second blockchain network, defining a second public smart contract.

11. The method of claim 10 further comprising performing a checkpointing process between the second private smart contract and the public smart contract comprising recording the state of the second private smart contract to the second public smart contract, defining a checkpointed second private smart contract.

12. The method of claim 1 wherein the synchronization process comprises:
determining an account on the first private blockchain network that has a token balance decrease, defining a decreasing account;
moving a value of the token balance decrease from an account on the second blockchain network corresponding to the decreasing account to a vault account on the second blockchain network;
determining if a total token supply on the first private blockchain network has increased since an immediate previous synchronization process;
if the total token supply on the first private blockchain network has increased, creating new tokens and sending them to the vault account;
if the total token supply on the first private blockchain network has not increased, burning an amount of tokens from the vault account equal to the token balance decrease;
determining an account on the first private blockchain network that has a token balance increase, defining an increasing account; and
moving a value of the token balance increase from the vault account to an account on the second blockchain network corresponding to the increasing account.

13. The method of claim 1 wherein the second blockchain network is a second private blockchain network and the second smart contract is a second private smart contract, the method further comprising
receiving a third plurality of transactions on the first private blockchain network;
recording the third plurality of transactions to a third private block on the first private blockchain network;
receiving a fourth plurality of transactions on the first private blockchain network;
recording the fourth plurality of transactions to a fourth private block on the first private blockchain network;
generating a second merged block comprising the third private block and the fourth private block;
recording the second merged block to the second private blockchain network; and
generating a third merged block comprising each of the first and second merged blocks; and
recording the third merged block to a third blockchain network.

14. The method of claim 13 wherein:
a block generation time of the first private blockchain network is within a range from 1 millisecond (ms) to 10 ms;
a block generation time of the second private blockchain network is within a range from 1 second to 10 seconds; and
a block generation time of the third blockchain network is within a range from 1 minute to 10 minutes.

15. The method of claim 13 further comprising:
recording the third and fourth private blocks and the second merged block to the first private blockchain smart contract;
performing a synchronization process between the first private smart contract and the second smart contract;
recording each of the first, second, and third merged blocks to a third smart contract linked to the second private blockchain network, defining a third private smart contract; and performing a synchronization process between the third private smart contract and a fourth smart contract linked to the third blockchain network, defining a fourth smart contract.

16. The method of claim 13 wherein the third blockchain network is a public blockchain network.

17. The method of claim 1 further comprising:
applying a filter to the first plurality of transactions;
determining a subset of transactions of the first plurality of transactions; and
excluding the subset of transactions from being recorded to the first merged block.

18. A method of synchronizing transactions between private and public blockchains comprising:
receiving a first plurality of transactions on a first private blockchain network;
recording the first plurality of transactions to a first private block on the first private blockchain network;
receiving a second plurality of transactions on the first private blockchain network;
recording the second plurality of transactions to a second private block on the first private blockchain network;
generating a first merged block comprising the first private block and the second private block;
recording the first merged block to a single block on a public blockchain network;
recording each of the first private block, the second private block, and the first merged block to a smart contract linked to the first private blockchain network, defining a first private smart contract; and
performing a synchronization process between the first private smart contract and a smart contract linked to the public blockchain network, defining a public smart contract, the synchronization process comprising:
determining an account on the first private blockchain network that has a token balance decrease, defining a decreasing account;
moving a value of the token balance decrease from an account on the public blockchain network corresponding to the decreasing account to a vault account on the public blockchain network;
determining if a total token supply on the first private blockchain network has increased since an immediate previous synchronization process;
if the total token supply on the first private blockchain network has increased, creating new tokens and sending them to the vault account;
if the total token supply on the first private blockchain network has not increased, burning an amount of tokens from the vault account equal to the token balance decrease;
determining an account on the first private blockchain network that has a token balance increase, defining an increasing account; and
moving a value of the token balance increase from the vault account to an account on the public blockchain network corresponding to the increasing account.

19. A system for synchronizing transactions between blockchains comprising:
a processor;
a data store positioned in communication with the processor; and
a network communication device positioned in communication with each of the processor, the data store, and a network;
wherein the network communication device is operable to receive a first plurality of transactions on a first private blockchain network;
wherein the processor is operable to record the first plurality of transactions to a first private block on the first private blockchain network;
wherein the network communication device is operable to receive a second plurality of transactions on the first private blockchain network;
wherein the processor is operable to record the second plurality of transactions to a second private block on the first private blockchain network;
wherein the processor is operable to generate a first merged block comprising the first private block and the second private block;
wherein the processor is operable to record the first merged block to a single block on a second blockchain network;
wherein the processor is operable to record each of the first private block, the second private block, and the first merged block to a smart contract linked to the first private blockchain network, defining a first private smart contract; and
wherein the processor in conjunction with network communication device is operable to perform a synchronization process between the first private smart contract and a second smart contract linked to the second blockchain network, defining a second smart contract, the synchronization process comprising:
determining by the processor an account on the first private blockchain network that has a token balance decrease, defining a decreasing account;
moving by the network communication device a value of the token balance decrease from an account on the second blockchain network corresponding to the decreasing account to a vault account on the second blockchain network;
determining by the processor if a total token supply on the first private blockchain network has increased since an immediate previous synchronization process;
if the total token supply on the first private blockchain network has increased, creating by the processor new tokens and sending them by the network communication device to the vault account;
if the total token supply on the first private blockchain network has not increased, burning by the processor an amount of tokens from the vault account equal to the token balance decrease;
determining by the processor an account on the first private blockchain network that has a token balance increase, defining an increasing account; and
moving by the network communication device a value of the token balance increase from the vault account to an account on the second blockchain network corresponding to the increasing account.

* * * * *